US010084682B2

(12) United States Patent
Amada

(10) Patent No.: US 10,084,682 B2
(45) Date of Patent: Sep. 25, 2018

(54) INFORMATION PROCESSING APPARATUS, METHOD AND COMPUTER READABLE MEDIUM

(71) Applicant: FUJITSU LIMITED, Kawasaki-shi, Kanagawa (JP)

(72) Inventor: Tadao Amada, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 107 days.

(21) Appl. No.: 15/178,918

(22) Filed: Jun. 10, 2016

(65) Prior Publication Data
US 2016/0373333 A1    Dec. 22, 2016

(30) Foreign Application Priority Data
Jun. 19, 2015   (JP) ................. 2015-124220

(51) Int. Cl.
*G06F 15/173*  (2006.01)
*H04L 12/26*  (2006.01)
(Continued)

(52) U.S. Cl.
CPC .......... *H04L 43/16* (2013.01); *H04L 45/123* (2013.01); *H04L 47/29* (2013.01); *H04L 47/56* (2013.01);
(Continued)

(58) Field of Classification Search
CPC ... H04L 43/16; H04L 43/0888; H04L 45/123; H04L 47/29; H04L 47/56; H04L 49/3018; H04L 49/3027
See application file for complete search history.

(56) References Cited

U.S. PATENT DOCUMENTS

2004/0242154 A1* 12/2004 Takeda ................. H04B 7/2606
455/16
2005/0020265 A1* 1/2005 Funabiki ................. H04L 45/04
455/436
(Continued)

FOREIGN PATENT DOCUMENTS

JP      2014-507896    3/2014
WO   WO 2008/087846 A1   7/2008

*Primary Examiner* — Jonathan A Bui
(74) *Attorney, Agent, or Firm* — Staas & Halsey LLP

(57) ABSTRACT

An information processing apparatus includes: a memory configured to store first transmission-waiting packets received from a first apparatus and second transmission-waiting packets received from a second apparatus; a communication circuit configured to transmit the first transmission-waiting packets and the second transmission-waiting packets in accordance with a predetermined ratio; and a processor configured to measure stay time period, in the memory, of certain packet among the second transmission-waiting packets, determine, by referring to correspondence information that indicates correspondence between a hop number and a threshold value for the stay time period, whether or not the measured stay time period is equal to or longer than the threshold value corresponding to the number of hops from the second apparatus to the information processing apparatus, and output, when the stay time period is determined to be equal to or longer than the threshold value, identification information capable of identifying the certain packet.

20 Claims, 17 Drawing Sheets

(51) Int. Cl.
  *H04L 12/721*     (2013.01)
  *H04L 12/875*     (2013.01)
  *H04L 12/801*     (2013.01)
  *H04L 12/935*     (2013.01)

(52) U.S. Cl.
  CPC ...... *H04L 49/3018* (2013.01); *H04L 49/3027* (2013.01); *H04L 43/0888* (2013.01)

(56) References Cited

U.S. PATENT DOCUMENTS

| | | | |
|---|---|---|---|
| 2009/0110394 A1* | 4/2009 | Xu | H04J 14/0294 398/45 |
| 2010/0087200 A1 | 4/2010 | Ishii et al. | |
| 2011/0032818 A1* | 2/2011 | Yamaguchi | H04L 45/02 370/225 |
| 2011/0164527 A1* | 7/2011 | Mishra | H04L 45/123 370/252 |
| 2012/0159575 A1* | 6/2012 | Fukui | H04L 9/0844 726/3 |
| 2013/0051324 A1* | 2/2013 | Kim | H04W 28/14 370/328 |
| 2014/0092922 A1 | 4/2014 | Le Pallec et al. | |
| 2014/0181297 A1* | 6/2014 | Nakatsugawa | H04L 43/0876 709/224 |
| 2015/0085830 A1* | 3/2015 | Nozaki | H04W 40/00 370/332 |

\* cited by examiner

FIG. 11

| ID | HOP NUMBER GROUP | THRESHOLD VALUE |
|---|---|---|
| THRESHOLD VALUE 1 | HOP NUMBER GROUP #1 | 8 SECONDS |
| THRESHOLD VALUE 2 | HOP NUMBER GROUP #2 | 64 SECONDS |
| THRESHOLD VALUE 3 | HOP NUMBER GROUP #3 | 512 SECONDS |
| THRESHOLD VALUE 4 | HOP NUMBER GROUP #4 | 4096 SECONDS |
| THRESHOLD VALUE 5 | HOP NUMBER GROUP #5 | 32768 SECONDS |
| ... | ... | ... |
| THRESHOLD VALUE m | HOP NUMBER GROUP #m | $2^{(3xm)}$ SECONDS |

INFORMATION PROCESSING APPARATUS, METHOD AND COMPUTER READABLE MEDIUM

CROSS-REFERENCE TO RELATED APPLICATION

This application is based upon and claims the benefit of priority of the prior Japanese Patent Application No. 2015-124220, filed on Jun. 19, 2015, the entire contents of which are incorporated herein by reference.

FIELD

The present embodiment relates to an information processing apparatus, a method, and a computer readable medium.

BACKGROUND

A computer system is available in which a plurality of nodes are coupled with each other by a network topology such as a Torus network, a Mesh network or a Ring network and transmission and reception of a packet between nodes is performed by multi-hop communication. As a related prior art, for example, a technology is available in which a residence time period over a plurality of nodes of a communication network including a synchronization architecture of the transparent clock base is monitored. Further, for example, a technology is available in which the number of mobile stations in which data to be transmitted exist in a transmission buffer is calculated and acceptance of a new call is performed on the basis of the number of mobile stations.

As an example of a prior art, for example, Japanese National Publication of International Patent Application No. 2014-507896 and International Publication Pamphlet No. WO 2008/087846 are known.

SUMMARY

According to an aspect of the embodiment, an information processing apparatus includes: a memory configured to store first transmission-waiting packets whose transmission source is a first apparatus and second transmission-waiting packets whose transmission source is a second apparatus different from the first apparatus; a communication circuit configured to transmit the first transmission-waiting packets or the second transmission-waiting packets in accordance with a predetermined ratio; and a processor configured to measure a stay time period, in the memory, of a certain packet among the second transmission-waiting packets, determine, by referring to correspondence information that indicates correspondence between a hop number and a threshold value for the stay time period, whether or not the measured stay time period is equal to or longer than the threshold value corresponding to the number of hops from the second apparatus to the information processing apparatus, and output, when the stay time period is determined to be equal to or longer than the threshold value, identification information capable of identifying the certain packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is an explanatory view illustrating a third example of the storage substance of the correspondence information table;

DESCRIPTION OF EMBODIMENTS

With the technology described above, it is difficult to detect residence of a packet in a node. For example, since the permissible stay time period of a packet differs depending upon the length of a communication path, it is difficult to detect residence of a packet from the length of the stay time period. This makes it difficult to detect residence of a packet at an appropriate timing and issue a notification of the detected residence to a monitoring server or the like.

In one aspect of a working example, it is an object of the present embodiment to make it possible to detect resistance of a packet at an appropriate timing and issue a notification of the detected residence.

In the following, an information processing apparatus, a communication packet residence notification method and a communication packet residence notification program according to the present embodiment are described in detail with reference to the drawings.

(Working Example of Communication Packet Residence Notification Method According to Embodiment)

Figure 1:
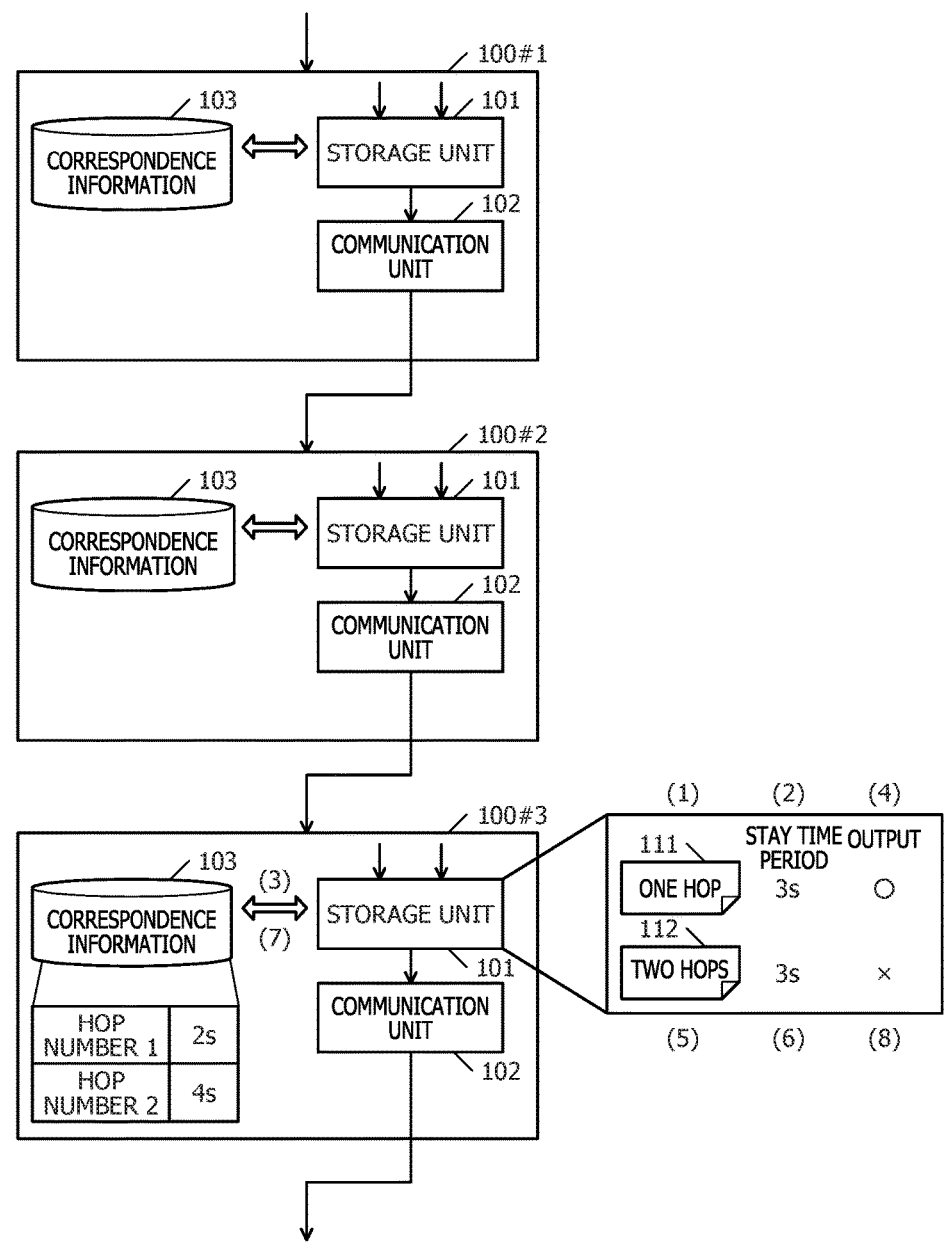
FIG. 1 is an explanatory view depicting a working example of a communication packet residence notification method according to an embodiment.

FIG. 1 is an explanatory view depicting a working example of the communication packet residence notification method according to the embodiment. Referring to FIG. 1, an information processing apparatus 100 is a computer that detects residence of a packet at an appropriate timing. In the following description, where a plurality of information processing apparatuses 100 are involved, in order to distinguish the plurality of information processing apparatuses 100 from each other, the information processing apparatus is sometimes represented as "information processing apparatus 100#i." The character i here indicates a natural number.

Here, in a computer system in which a plurality of nodes are coupled with each other by a network topology such as a Torus network, a Mesh network or a Ring network, a process of a job when the job is executed using a plurality of nodes is sometimes delayed. For example, congestion or the like of packets sometimes occurs in a relay node on a communication path between nodes that execute the job, and a packet sometimes resides in the relay node. At this time, the communication time period involved with transmitting and receiving a packet to and from between the nodes that execute the job increases, by which the process of the job is delayed.

However, after execution of the job comes to an end, it is difficult to reproduce the situation in which the process of the job is delayed, and it is sometimes difficult to decide whether a packet resides because congestion or the like of packets occurs in a relay node on a communication path between nodes that execute the job. For example, even if a same job is executed again by the same nodes, if a use situation of the relay node on the communication path between the nodes that execute the job varies and congestion of packets does not occur in the relay node and residence of a packet does not occur, then the situation in which a process of the job is delayed is not reproduced.

On the other hand, even if absolute evaluation of the stay time period of a packet in the relay node is performed, it is sometimes difficult to detect residence of a packet in the relay node. For example, when a packet passes through a plurality of relay nodes, the possibility that the number of different packets that wait for transmission in each relay node may increase every time the packet passes a relay node is high. There is a tendency that, even if residence of the packet does not occur, the stay time period for each relay node is elongated as the length of the communication path increases. In other words, since the allowable stay time period differs depending upon the length of the communication path, even if the stay time period is determined by the absolute evaluation, it is difficult to detect residence of a packet. For example, where a threshold value for the stay time period used when residence of a packet is to be detected is set to a low value when the communication path is shortest, even if residence of a packet does not occur, it is sometimes detected that a packet is residing.

In this manner, it is difficult to detect residence of a packet at an appropriate timing. Further, a notification of residence of a packet is sometimes issued to a monitoring server or the like although residence of a packet does not occur, which gives rise to increase of the load to analysis of a cause when a packet resides or increase of the communication amount of the network. Therefore, in the present embodiment, a communication packet residence notification method is described by which residence of a packet can be detected at an appropriate timing to allow issuance of a notification of the detected residence.

The information processing apparatus 100 operates as one of a plurality of nodes included in the computer system described above and performs transmission and reception of data to and from a different information processing apparatus 100 by multi-hop communication. For example, the information processing apparatus 100 includes a storage unit 101 that stores a transmission-waiting packet whose transmission source is a first apparatus and another transmission-waiting packet whose transmission source is a second apparatus different from the first apparatus. Each of the first apparatus and the second apparatus is one of nodes included in the computer system.

For example, the first apparatus is an own apparatus. The first apparatus may be an information processing apparatus 100 different from the own apparatus. The transmission-waiting packet is a packet whose transmission destination is a different information processing apparatus 100. For example, if the first apparatus is the own apparatus, the transmission-waiting packet whose transmission source is the first apparatus is a transmission-waiting packet generated by a job executed by the own apparatus. For example, the second apparatus is any information processing apparatus 100 different from the own apparatus. The transmission-waiting packet whose transmission source is the second apparatus is, for example, a transmission-waiting packet generated by a job executed by any other different information processing apparatus 100 that functions as the second apparatus.

Further, the information processing apparatus 100 includes a communication unit 102 that transmits a transmission-waiting packet whose transmission source is the first apparatus and another transmission-waiting packet whose transmission source is the second apparatus in accordance with a predetermined ratio. The predetermined ratio is a ratio indicating by what degree one of a transmission-waiting packet whose transmission source is the own apparatus and another transmission-waiting packet whose transmission source is a different information processing apparatus 100 is to be transmitted preferentially between these two packets.

For example, if the predetermined ratio is "1:1" and a transmission-waiting packet whose transmission source is the first apparatus or the second apparatus is stored in the storage unit 101, then the communication unit 102 alternately transmits the transmission-waiting packets whose transmission source is the first apparatus and the second apparatus. If the storage unit 101 has stored therein no more transmission-waiting packet whose transmission source is the first apparatus, then the communication unit 102 may successively transmit the transmission-waiting packets whose transmission source is the second apparatus. If the storage unit 101 has stored therein no more transmission-waiting packet whose transmission source is the second apparatus, then the communication unit 102 may successively transmit the transmission-waiting packets whose transmission source is the first apparatus.

Further, the information processing apparatus 100 measures the stay time period, in the storage unit 101, of a certain one of transmission-waiting packets whose transmission source is the second apparatus. The stay time period is, for example, an elapsed time period after a transmission-waiting packet whose transmission source is the second apparatus is retained into the storage unit 101 until the retained transmission-waiting packet is transmitted by the communication unit 102.

Further, the information processing apparatus 100 refers to correspondence information 103 to decide whether or not a stay time period measured with regard to a certain packet is equal to or longer than a threshold value corresponding to the number of hops from the second apparatus to the own apparatus. The threshold value is a reference value for deciding whether or not congestion of packets or the like occurs in the own apparatus to cause residence of a packet. The correspondence information 103 is information indicative of a correspondence relationship between the number of hops and a threshold value for the stay time period.

Here, the possibility is high that the number of different transmission-waiting packets may increase as the number of hops of a packet increases, and the throughput of the packet is liable to degrade and the stay time period of the packet is liable to increase. The throughput is, for example, a transfer amount of a certain packet per unit time. Therefore, a threshold value is set to the correspondence information 103 such that the threshold value has a higher value as the hop number increases so as to make it possible to decide whether or not a packet has resided in the own apparatus taking increase of the stay time period of a packet by degradation of the throughput into consideration.

Then, if it is determined that the stay time period is equal to or longer than the threshold value, then the information processing apparatus 100 outputs information capable of identifying a packet with regard to which it has been determined that the stay time period is equal to or longer than the threshold value as information indicating the packet with regard to which there is the possibility that the packet may have resided in the own apparatus. The information capable of identifying the packet can be for example, identification information of the packet, identification information of the transmission source or the destination of the packet, identification information of a job by which the packet has been generated or the like.

In the example of FIG. 1, (1) the information processing apparatus 100#3 stores a first packet 111 that has arrived at the own apparatus by one hop on a communication path from the different information processing apparatus 100#2 to the own apparatus into the storage unit 101. (2) The information processing apparatus 100#3 measures the stay time period "3s" of the first packet 111 in the storage unit 101 after the first packet 111 is stored into the storage unit 101 until the first packet 111 is transmitted to the communication unit 102.

(3) The information processing apparatus 100#3 refers to the correspondence information 103 to acquire the threshold value "2s" corresponding to the hop number "1" of the first packet 111 and decides whether or not the stay time period "3s" of the first packet 111 is equal to or longer than the threshold value. Here, the information processing apparatus 100#3 decides that the stay time period is equal to or longer than the threshold value.

(4) Since the information processing apparatus 100#3 decides that the stay time period of the first packet 111 is equal to or longer than the threshold value, the information processing apparatus 100#3 determines that there is the possibility that congestion of communication or the like may have occurred in the own apparatus upon transmission and reception of the first packet 111 and outputs information capable of identifying the first packet 111. In other words, the information processing apparatus 100#3 decides that the stay time period of the first packet 111 has increased and there is the possibility that the first packet 111 may have resided, and outputs the information capable of identifying the first packet 111.

(5) The information processing apparatus 100#3 stores a second packet 112 that has reached the own apparatus by two hops on a communication path from the different information processing apparatus 100#1 to the own apparatus into the storage unit 101. (6) The information processing apparatus 100#3 measures the stay time period "3s" of the second packet 112 in the storage unit 101 after the second packet 112 is stored into the storage unit 101 until the second packet 112 is transmitted to the communication unit 102.

(7) The information processing apparatus 100#3 refers to the correspondence information 103 to acquire the threshold value "4s" corresponding to the hop number "2" of the second packet 112 and decides whether or not the stay time period "3s" of the second packet 112 is equal to or longer than the threshold value. Here, the information processing apparatus 100#3 decides that the stay time period is not equal to or longer than the threshold value.

(8) Since the information processing apparatus 100#3 has determined that the stay time period of the second packet 112 is not equal to or longer than the threshold value, the information processing apparatus 100#3 does not output information capable of identifying the second packet 112. In other words, the information processing apparatus 100#3 decides that, even if the stay time period increases, the second packet 112 does not reside, and does not output information capable of identifying the second packet 112.

In this manner, with the information processing apparatus 100, even if packets have an equal stay time period, the stay time period can be compared with a threshold value that differs depending upon the hop number, and if the stay time period is equal to or longer than the threshold value, then it can be determined that congestion of packets or the like occurs with the own apparatus and there is the possibility that the packet may have resided in the own apparatus. Consequently, the information processing apparatus 100 can suppress such decision that there is the possibility that the packet may have resided although the stay time period has increased by increase of the number of hops.

On the other hand, even if there are a plurality of packets whose stay time period is equal to or longer than a predetermined value, the information processing apparatus 100 can distinguish between a packet with regard to which there is the possibility that the packet may have resided in the own apparatus and another packet whose stay time period is increased by increase of the number of hops. Further, the information processing apparatus 100 can output information capable of identifying a packet with regard to which there is the possibility that congestion of packets may have occurred in the own apparatus to cause residence of the packet.

Further, since the information processing apparatus 100 suppresses outputting of information capable of identifying a packet that does not suffer from residence, it is possible to suppress increase of the size of the memory that stores a packet that may possibly have suffered from residence and suppress increase of the communication amount in the computer system. Further, since the information processing apparatus 100 suppresses outputting of information capable of identifying a packet that does not suffer from residence, it is possible to suppress increase of the load when a cause of residence of a packet or the like is analyzed.

Further, a user of the computer system can refer to information that is outputted by the information processing apparatus 100 and is capable of identifying a packet with regard to which it is determined that the stay time period is equal to or longer than the threshold value. Then, when a packet identified by the information outputted by the information processing apparatus 100 is transmitted and received, the user can recognize that congestion or the like occurs in the information processing apparatus 100 and there is the possibility that a packet may have resided. For example, if there are a plurality of successive information processing apparatuses 100 in which there is the possibility that a packet may have resided, then the user can analyze that there is the possibility that residence of a packet may have been caused by the information processing apparatus 100 on the last stage.

Here, although the case is described in which, in regard to the information processing apparatus 100, the first apparatus is the own apparatus and a transmission-waiting packet whose transmission source is the own apparatus or a different information processing apparatus 100 is transmitted in accordance with a predetermined ratio, the information processing apparatus 100 is not limited to this. For example, the information processing apparatus 100 may be an apparatus that itself does not generate a packet but transmits a transmission-waiting packet whose transmission source is one of two different information processing apparatuses 100 and another transmission-waiting packet whose transmission source is the other one of the two different information processing apparatuses 100 in accordance with a predetermined ratio.

Here, while the case is described in which the information processing apparatus 100 transmits a transmission-waiting packet whose transmission source is the first apparatus or the second apparatus in accordance with the predetermined ratio, the information processing apparatus 100 is not limited to this. For example, the information processing apparatus 100 may be an apparatus that transmits transmission-waiting packets whose transmission sources are three or more apparatuses in accordance with a predetermined ratio.

Here, operation of the information processing apparatus 100 described above can be implemented by hardware using an electric circuit. Also it is possible to implement operation of the information processing apparatus 100 by software using a processor and a memory. In the following, a case is described in which operation of the information processing apparatus 100 described above is implemented by hardware using an electric circuit.

(Example of Hardware Configuration of Information Processing Apparatus 100)

In the following, an example of a hardware configuration of the information processing apparatus 100 depicted in FIG. 1 is described with reference to FIG. 2.

Figure 2:
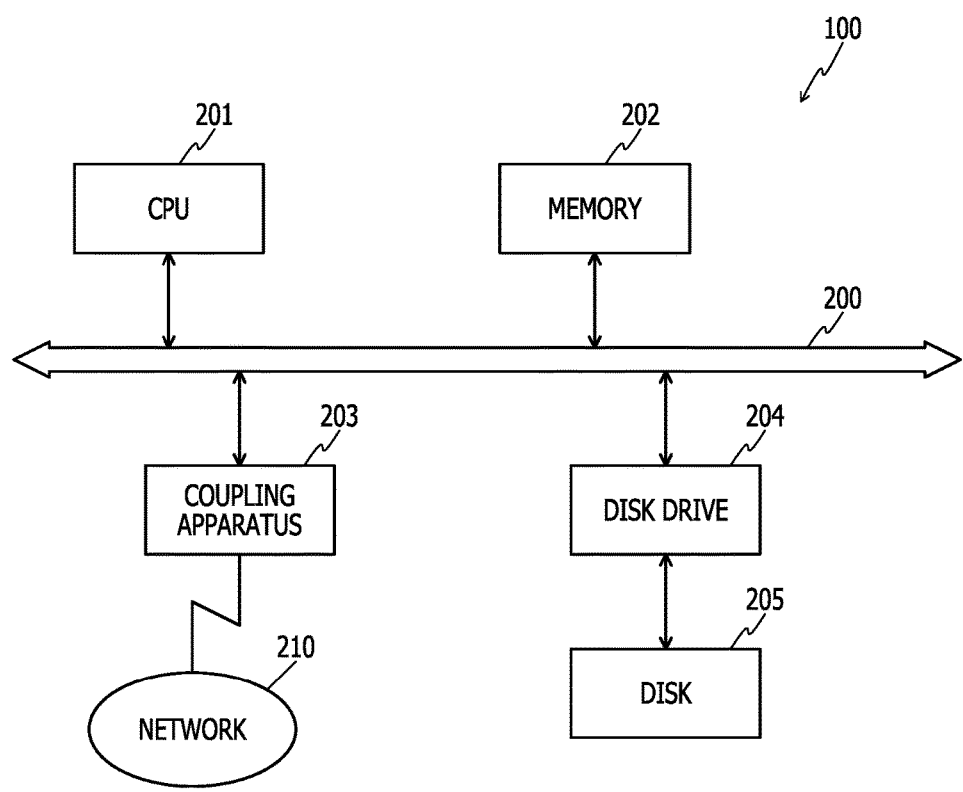
FIG. 2 is a block diagram depicting an example of a hardware configuration of an information processing apparatus.

FIG. 2 is a block diagram depicting an example of a hardware configuration of the information processing apparatus 100. Referring to FIG. 2, the information processing apparatus 100 includes a central processing unit (CPU) 201, a memory 202, and a coupling apparatus 203, a disk drive 204 and a disk 205. Further, the CPU 201, memory 202, coupling apparatus 203 and disk drive 204 are coupled with each other by a bus 200.

Here, the CPU 201 performs control for the overall information processing apparatus 100. The memory 202 includes, for example, a read only memory (ROM), a random access memory (RAM), a flash ROM and so forth. In particular, for example, the flash ROM and the ROM store various programs therein and the RAM is used as a work area of the CPU 201. Various programs stored in the memory 202 are loaded into the CPU 201 so as to cause the CPU 201 to execute processes coded in the programs.

The coupling apparatus 203 is coupled with a network 210 through a communication line and is coupled with a different computer (for example, different information processing apparatus 100) through the network 210. Further, the coupling apparatus 203 controls an interface between the network 210 and the inside of the own information processing apparatus 100 and controls inputting and outputting of data from and to the different computer. An example of a hardware configuration of the coupling apparatus 203 is hereinafter described, for example, with reference to FIG. 3. Further, where operation of the information processing apparatus 100 is implemented by software, the coupling apparatus 203 may be a modem, a local area network (LAN) adaptor or the like.

The disk drive 204 controls read/write of data from and to the disk 205 under the control of the CPU 201. The disk drive 204 is, for example, a magnetic disk drive. The disk 205 is a nonvolatile memory that stores data written under the control of the disk drive 204. The disk 205 is, for example, a magnetic disk, an optical disk or the like.

The information processing apparatus 100 may include not only the components described above but also, for example, a keyboard, a mouse, a display unit and so forth. Further, the information processing apparatus 100 may include a solid state drive (SSD), a semiconductor memory or the like in place of the disk drive 204 and the disk 205.

(Example of Hardware Configuration of Coupling Apparatus 203)

Next, an example of a hardware configuration of the coupling apparatus 203 depicted in FIG. 2 is described with reference to FIG. 3.

Figure 3:
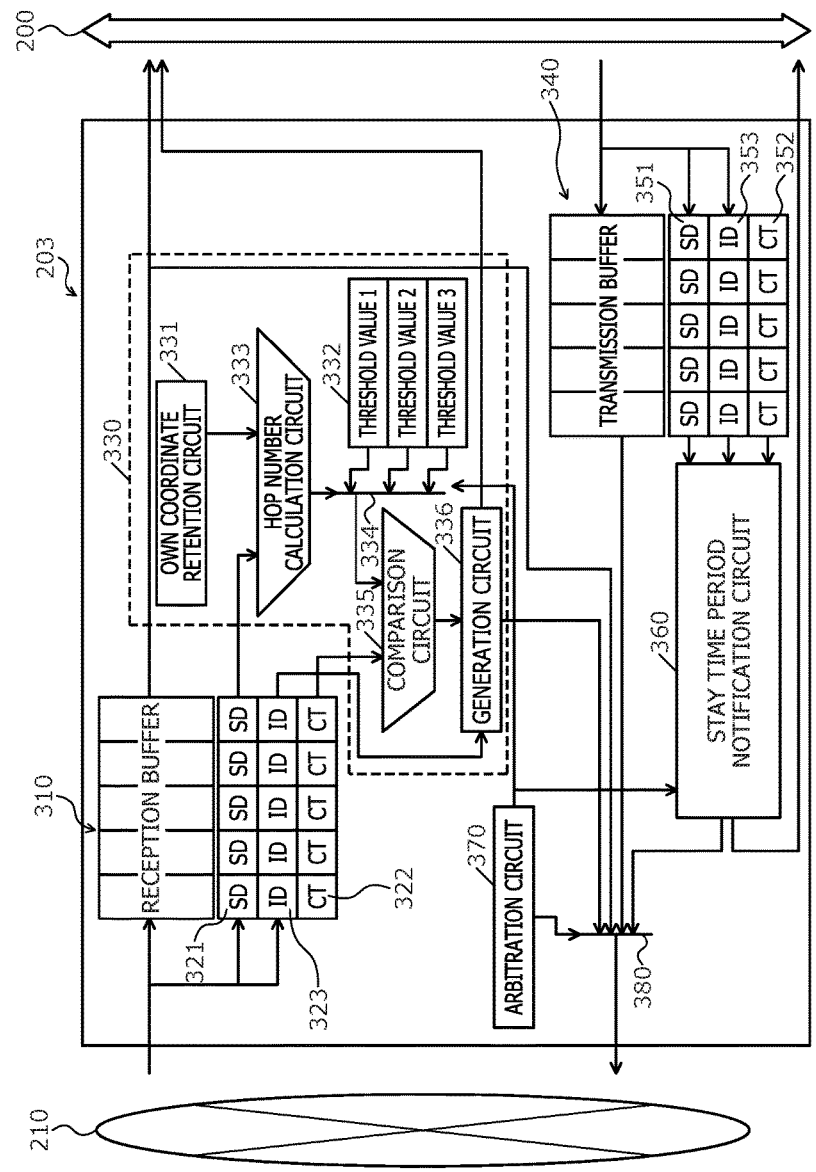
FIG. 3 is a block diagram depicting an example of a hardware configuration of a coupling apparatus.

FIG. 3 is a block diagram depicting an example of a hardware configuration of the coupling apparatus 203. Referring to FIG. 3, the coupling apparatus 203 includes reception buffers 310#1 to 310#n. Further, the coupling apparatus 203 includes reception side coordinate registers 321#1 to 321#n, reception side counter registers 322#1 to 322#n, reception side packet identification (ID) registers 323#1 to 323#n and a reception side stay time period notification circuit 330. The character n indicates a natural number.

Further, the coupling apparatus 203 includes transmission buffers 340#1 to 340#n. Further, the coupling apparatus 203 includes transmission side coordinate registers 351#1 to 351#n, transmission side counter registers 352#1 to 352#n, transmission side packet ID registers 353#1 to 353#n and a transmission side stay time period notification circuit 360. Further, the numbers of stages of the reception buffers 310 and the transmission buffers 340 may be different from each other. Further, the coupling apparatus 203 includes an arbitration circuit 370 and a transmission circuit 380.

The reception buffers 310#1 to 310#n are coupled with the network 210 and receive, as inputs thereto, and retain transmission-waiting packets whose transmission source are different information processing apparatuses 100 and which are inputted through the network 210. The reception buffers 310#1 to 310#n are coupled with the bus 200 of the own apparatus and, if a packet retained therein is a transmission-waiting packet whose destination is the own apparatus, then the reception buffers 310#1 to 310#n output the packet to the bus 200 of the own apparatus. The reception buffers 310#1 to 310#n are coupled with the transmission circuit 380 and, if a packet retained therein is a transmission-waiting packet whose destination is a different information processing apparatus 100, then the reception buffers 310#1 to 310#n output the packet to the transmission circuit 380.

The reception side coordinate registers 321#1 to 321#n correspond to the reception buffers 310#1 to 310#n, respectively. The reception side coordinate registers 321#1 to 321#n are coupled with the network 210 and receive, as inputs thereto from the network 210, and retain a transmission source coordinate and a destination coordinate of a transmission-waiting packet that is individually retained in the reception buffers 310#1 to 310#n. The reception side coordinate registers 321#1 to 321#n are coupled with the reception side stay time period notification circuit 330 and output the transmission source coordinate and the destination coordinate retained therein to the reception side stay time period notification circuit 330.

The reception side counter registers 322#1 to 322#n correspond to the reception buffers 310#1 to 310#n, respectively. The reception side counter registers 322#1 to 322#n retain a counter value indicating a stay time period of a transmission-waiting packet individually retained in the reception buffers 310#1 to 310#n, and count up the counter value after every fixed period of time. The reception side counter registers 322#1 to 322#n are coupled with the reception side stay time period notification circuit 330 and output the retained counter value indicating the stay time period to the reception side stay time period notification circuit 330.

The reception side packet ID registers 323#1 to 323#n correspond to the reception buffers 310#1 to 310#n, respectively. The reception side packet ID registers 323#1 to 323#n are coupled with the network 210 and receive, as inputs thereto from the network 210, and retain identification information of transmission-waiting packets individually retained in the reception buffers 310#1 to 310#n. The reception side packet ID registers 323#1 to 323#n are coupled with the reception side stay time period notification circuit 330 and output the identification information retained therein to the reception side stay time period notification circuit 330.

Where the transmission source coordinate and the destination coordinate of a transmission-waiting packet individually retained in the reception buffers 310#1 to 310#n can be outputted from the packet, the coupling apparatus 203 does not have to include the reception side coordinate registers 321#1 to 321#n. Further, where identification information of a transmission-waiting packet individually retained in the reception buffers 310#1 to 310#n can be outputted from the packet, the coupling apparatus 203 does not have to include the reception side packet ID registers 323#1 to 323#n.

The reception side stay time period notification circuit 330 includes an own coordinate retention circuit 331, a threshold value retention circuit 332, a hop number calculation circuit 333, a threshold value selection circuit 334, a comparison circuit 335 and a generation circuit 336. The own coordinate retention circuit 331 is a storage circuit for retaining an own coordinate. The own coordinate retention circuit 331 is coupled with the hop number calculation circuit 333 and outputs the retained own coordinate to the hop number calculation circuit 333.

The hop number calculation circuit 333 is coupled with the own coordinate retention circuit 331 and receives the own coordinate inputted from the own coordinate retention circuit 331. The hop number calculation circuit 333 is coupled with the reception side coordinate registers 321#1 to 321#n and receives a transmission source coordinate inputted thereto from the reception side coordinate registers 321#1 to 321#n. The hop number calculation circuit 333 compares the own coordinate and the transmission source coordinate inputted thereto with each other to calculate the number of hops of a transmission-waiting packet. The hop number calculation circuit 333 is coupled with the threshold value selection circuit 334 and outputs the calculated hop number to the threshold value selection circuit 334.

An example of a hardware configuration of the hop number calculation circuit 333 is hereinafter described, for example, with reference to FIG. 4. If the transmission source coordinate is, for example, smaller than the own coordinate, then the hop number calculation circuit 333 calculates the own coordinate−transmission source coordinate as the hop number. On the other hand, if the transmission source coordinate is not smaller than the own coordinate, then the hop number calculation circuit 333 calculates, as the hop number, the own coordinate−transmission source coordinate+maximum hop number in the computer system.

The threshold value retention circuit 332 retains a threshold value corresponding to each of a plurality of hop numbers. The threshold value retention circuit 332 is coupled with the threshold value selection circuit 334 and outputs the retained threshold values to the threshold value selection circuit 334. The threshold value selection circuit 334 is coupled with the hop number calculation circuit 333 and receives the hop numbers inputted thereto. The threshold value selection circuit 334 is coupled with the threshold value retention circuit 332 and receives the plurality of threshold values inputted thereto. The threshold value selection circuit 334 selects a threshold value corresponding to the inputted hop number from among the plurality of inputted threshold values. The threshold value selection circuit 334 is coupled with the comparison circuit 335 and outputs the selected threshold value to the comparison circuit 335.

The comparison circuit 335 is coupled with the reception side counter registers 322#1 to 322#n and receives stay time periods inputted thereto. The comparison circuit 335 is coupled with the threshold value selection circuit 334 and receives the threshold value inputted thereto. The comparison circuit 335 compares the inputted stay time period and the inputted threshold value with each other. The comparison circuit 335 is coupled with the generation circuit 336 and outputs a result of the comparison between the stay time period and the threshold value to the generation circuit 336.

The generation circuit 336 is coupled with the comparison circuit 335 and receives a result of the comparison between the stay time period and the threshold value inputted thereto. The generation circuit 336 is coupled with the reception side packet ID registers 323#1 to 323#n and receives identification information inputted thereto. If the stay time period is equal to or longer than the threshold value on the basis of a result of the comparison between the inputted stay time period and the threshold value, then the generation circuit 336 generates a notification packet including the inputted identification information. The generation circuit 336 is coupled with the transmission circuit 380 and outputs the generated notification packet to the transmission circuit 380. The generation circuit 336 is coupled with the bus 200 of the own apparatus and outputs the generated notification packet to the bus 200 of the own apparatus.

Transmission buffers 340#1 to 340#n are coupled with the bus 200 of the own apparatus and retain a transmission-waiting packet whose transmission source is the own apparatus and which is inputted from the bus 200 of the own apparatus. The transmission buffers 340#1 to 340#n are coupled with the transmission circuit 380 and, if the retained packet is a transmission-waiting packet whose destination is a different information processing apparatus 100, then the transmission buffers 340#1 to 340#n output the retained packet to the transmission circuit 380.

Transmission side coordinate registers 351#1 to 351#n correspond to the transmission buffers 340#1 to 340#n, respectively. The transmission side coordinate registers 351#1 to 351#n are coupled with the bus 200 of the own apparatus and retain a transmission source coordinate and a destination coordinate of a transmission-waiting packet that is individually retained in the transmission buffers 340#1 to 340#n and is inputted from the bus 200 of the own apparatus. The transmission side coordinate registers 351#1 to 351#n are coupled with the transmission side stay time period notification circuit 360 and output the retained transmission source coordinate and destination coordinate to the transmission side stay time period notification circuit 360.

Transmission side counter registers 352#1 to 352#n correspond to the transmission buffers 340#1 to 340#n, respectively. The transmission side counter registers 352#1 to 352#n retain a counter value indicating a stay time period of a transmission-waiting packet individually retained in the transmission buffers 340#1 to 340#n and count up a counter value after every fixed time period. The transmission side counter registers 352#1 to 352#n are coupled with the transmission side stay time period notification circuit 360 and output the retained counter value indicating a stay time period to the transmission side stay time period notification circuit 360.

Transmission side packet ID registers 353#1 to 353#n correspond to the transmission buffers 340#1 to 340#n, respectively. The transmission side packet ID registers 353#1 to 353#n are coupled with the bus 200 of the own apparatus and retain identification information of a transmission-waiting packet that is individually retained in the transmission buffers 340#1 to 340#n and is inputted from the bus 200 of the own apparatus. The transmission side packet ID registers 353#1 to 353#n are coupled with the transmission side stay time period notification circuit 360 and output the retained identification information to the transmission side stay time period notification circuit 360.

If a transmission source coordinate and a destination coordinate of a transmission-waiting packet individually retained in the transmission buffers 340#1 to 340#n can be outputted from the packet, then the coupling apparatus 203 does not have to include the transmission side coordinate registers 351#1 to 351#n. Further, if identification information of a transmission-waiting packet individually retained in the transmission buffers 340#1 to 340#n can be outputted from the packet, the coupling apparatus 203 does not have to include the transmission side packet ID registers 353#1 to 353#n.

Since the transmission side stay time period notification circuit 360 operates similarly to the reception side stay time period notification circuit 330, description of the transmission side stay time period notification circuit 360 is omitted herein. The transmission side stay time period notification circuit 360 generates a notification packet and outputs the generated notification packet to the transmission circuit 380 or the bus 200 of the own apparatus.

The arbitration circuit 370 determines which one of transmission-waiting packets retained in the reception buffers 310#1 to 310#n and the transmission buffers 340#1 to 340#n is to be transmitted in accordance with a predetermined ratio. If a transmission-waiting packet retained in the reception buffers 310#1 to 310#n is to be transmitted, the arbitration circuit 370 starts operation of the reception side stay time period notification circuit 330. If a transmission-waiting packet retained in the transmission buffers 340#1 to 340#n is to be transmitted, the arbitration circuit 370 starts operation of the transmission side stay time period notification circuit 360. If a notification packet is generated as a result of starting of operation of the reception side stay time period notification circuit 330 or the transmission side stay time period notification circuit 360, the arbitration circuit 370 determines which one of a transmission-waiting packet and the notification packet is to be transmitted.

The transmission circuit 380 is coupled with the reception buffers 310#1 to 310#n and receives, as an input thereto, a transmission-waiting packet whose transmission source is a different information processing apparatus 100 and which is inputted from the reception buffers 310#1 to 310#n. The transmission circuit 380 is coupled with the transmission buffers 340#1 to 340#n and receives, as an input thereto, a transmission-waiting packet whose transmission source is the own apparatus and which is inputted from the transmission buffers 340#1 to 340#n. The transmission circuit 380 is coupled with the reception side stay time period notification circuit 330 and receives, as an input thereto, a notification packet from the reception side stay time period notification circuit 330. The transmission circuit 380 is coupled with the transmission side stay time period notification circuit 360 and receives, as an input thereto, a notification packet from the transmission side stay time period notification circuit 360.

The transmission circuit 380 is coupled with the arbitration circuit 370 and outputs a transmission-waiting packet retained in one of the reception buffers 310#1 to 310#n and the transmission buffers 340#1 to 340#n to the network 210 in accordance with the determination of the arbitration circuit 370. Further, the transmission circuit 380 is coupled with the arbitration circuit 370 and outputs a notification packet generated by the reception side stay time period notification circuit 330 or the transmission side stay time period notification circuit 360 to the network 210 in accordance with the determination of the arbitration circuit 370.

(Example of Hardware Configuration of Hop Number Calculation Circuit 333)

Now, an example of a hardware configuration of the hop number calculation circuit 333 depicted in FIG. 3 is described with reference to FIG. 4.

Figure 4:
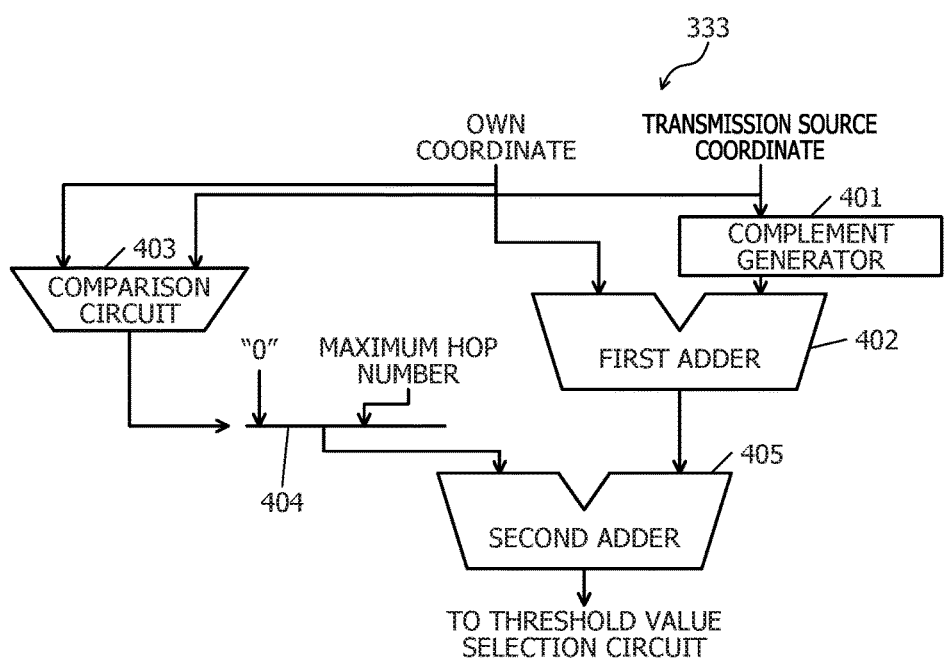
FIG. 4 is a block diagram depicting an example of a hardware configuration of a hop number calculation circuit.

FIG. 4 is a block diagram depicting an example of a hardware configuration of the hop number calculation circuit 333. Referring to FIG. 4, the hop number calculation circuit 333 includes a complement generator 401, a first adder 402, a comparison circuit 403, a selection circuit 404 and a second adder 405.

The complement generator 401 is coupled with the reception side coordinate registers 321#1 to 321#n, and receives, as an input thereto, a transmission source coordinate from the reception side coordinate registers 321#1 to 321#n and calculates a two's complement of the transmission source coordinate. The complement generator 401 is coupled with the first adder 402 and outputs the calculated two's complement of the transmission source coordinate to the first adder 402. The first adder 402 is coupled with the own coordinate retention circuit 331 and receives the own coordinate inputted thereto. The first adder 402 is coupled with the complement generator 401 and receives, as an input thereto, the two's complement of the transmission source coordinate. The first adder 402 calculates on the basis of the own coordinate and the two's complement of the transmission source coordinate inputted thereto, the difference from the own coordinate to the transmission source coordinate, namely, "own coordinate − transmission source coordinate." The first adder 402 is coupled with the second adder 405 and outputs the calculated difference "own coordinate − transmission source coordinate" to the second adder 405.

The comparison circuit 403 is coupled with the reception side coordinate registers 321#1 to 321#n and receives a transmission source coordinate inputted from the reception side coordinate registers 321#1 to 321#n. The comparison circuit 403 is coupled with the own coordinate retention circuit 331 and receives the own coordinate inputted thereto. The comparison circuit 403 compares the inputted own coordinate and the inputted transmission source coordinate with each other. The comparison circuit 403 is coupled with the selection circuit 404 and outputs a result of the comparison between the own coordinate and the transmission source coordinate to the selection circuit 404.

The selection circuit 404 is coupled with the comparison circuit 403 and receives a result of the comparison between the own coordinate and the transmission source coordinate as inputs thereto from the comparison circuit 403. The selection circuit 404 selects 0 or a maximum hop number on the basis of the result of the comparison between the own coordinate and the transmission source coordinate inputted thereto. If, for example, the result of the comparison does not indicate that the transmission source coordinate is smaller than the own coordinate, then the selection circuit 404 selects the maximum hop number so as to use the maximum hop number when the second adder 405 calculates the "own coordinate − transmission source coordinate + maximum hop number." On the other hand, if the result of the comparison indicates that the transmission source coordinate is smaller than the own coordinate, then since the maximum hop number is not used when the second adder 405 calculates the "own coordinate − transmission source coordinate," the selection circuit 404 formally selects 0. The selection circuit 404 is coupled with the second adder 405 and outputs 0 or the maximum hop number selected thereby to the second adder 405.

The second adder 405 is coupled with the first adder 402 and receives the difference "own coordinate − transmission source coordinate" from the own coordinate to the transmission source coordinate as an input thereto. The second adder 405 is coupled with the selection circuit 404 and receives 0 or the maximum hop number selected by the selection circuit 404 as an input thereto. The second adder 405 adds the difference "own coordinate − transmission source coordinate" inputted thereto and 0 or the maximum hop number inputted thereto to calculate "own coordinate − transmission source coordinate + maximum hop number" or "own coordinate − transmission source coordinate." The second adder 405 is coupled with the selection circuit 404 and outputs the "own coordinate − transmission source coordinate + maximum hop number in the computer system" or the "own coordinate − transmission source coordinate" calculated thereby to the selection circuit 404.

Although a case is described here in which whether 0 or the maximum hop number is to be added to the difference inputted from the first adder 402 is determined in response to a selection result of the selection circuit 404 by the second adder 405, the determination is not limited to this. For example, if the first adder 402 has an overflow bit, when an overflow occurs from the first adder 402, the maximum hop number may be added by the second adder 405.

(Example of Computer System 500)

Now, an example of a computer system 500 in which a plurality of information processing apparatuses 100 coupled with each other described hereinabove with reference to FIG. 2 is described with reference to FIG. 5.

Figure 5:
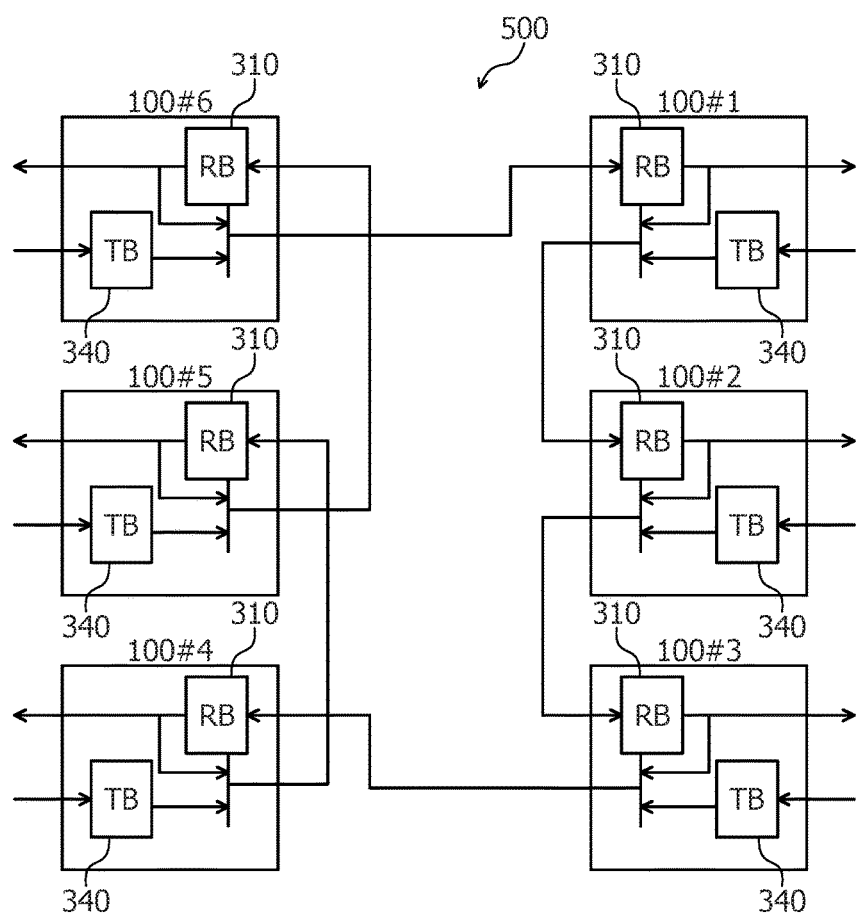
FIG. 5 is an explanatory view depicting an example of a computer system.

FIG. 5 is an explanatory view depicting an example of the computer system 500. Referring to FIG. 5, the computer system 500 includes x information processing apparatuses 100 coupled with each other by a Ring network. In the example of FIG. 5, x is 6. Here, the first stage information processing apparatus 100#1 at the top and the sixth stage information processing apparatus 100#6 at the tail end are coupled with each other to implement a Ring network. Therefore, the first stage information processing apparatus 100#1 at the top is a succeeding stage information processing apparatus 100 to the sixth stage information processing apparatus 100#6 at the tail end. Meanwhile, the sixth stage information processing apparatus 100#6 at the tail end is a preceding stage information processing apparatus 100 to the first stage information processing apparatus 100#1 at the top.

In the computer system 500, each information processing apparatus 100 receives a packet from a preceding stage information processing apparatus 100 and retains the received transmission-waiting packet into the reception buffer 310 thereof. The information processing apparatus 100 retains a transmission-waiting packet generated by the own apparatus into the transmission buffer 340 thereof. The information processing apparatus 100 transmits the transmission-waiting packet retained in the transmission buffer 340 or the transmission-waiting packet retained in the reception buffer 310 to the succeeding stage information processing apparatus 100 in accordance with a predetermined ratio.

Consequently, in the computer system 500, a packet is transmitted in one direction on the network 210. For example, a packet to be transmitted from the information processing apparatus 100#1 to the information processing apparatus 100#6 is transmitted to the information processing apparatus 100#6 after the packet is successively relayed by the information processing apparatuses 100#2 to 100#5.

(Example of Functional Configuration of Information Processing Apparatus 100)

Now, an example of a functional configuration of the information processing apparatus 100 is described with reference to FIG. 6.

Figure 6:
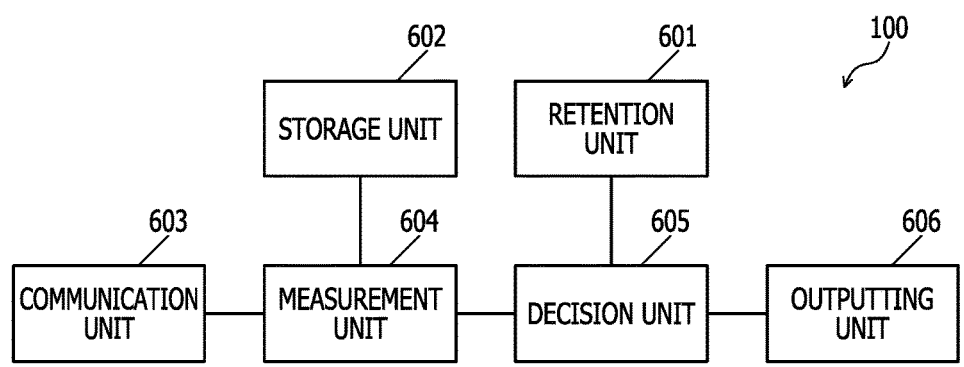
FIG. 6 is a block diagram depicting an example of a functional configuration of an information processing apparatus.

FIG. 6 is a block diagram depicting an example of a functional configuration of the information processing apparatus 100. Referring to FIG. 6, the information processing apparatus 100 includes a retention unit 601, a storage unit 602, a communication unit 603, a measurement unit 604, a decision unit 605 and an outputting unit 606.

The storage unit 602, retention unit 601 and communication unit 603 have functions implemented, for example, by the coupling apparatus 203 depicted in FIG. 3. The measurement unit 604, decision unit 605 and outputting unit 606 have functions that implement a control unit and are implemented, for example, by the coupling apparatus 203 depicted in FIG. 3.

The storage unit 602 retains a transmission-waiting packet whose transmission source is a first apparatus and another transmission-waiting packet whose transmission source is a second apparatus different from the first apparatus. The first apparatus is, for example, the own apparatus. The second apparatus is, for example, each of more than one information processing apparatuses 100 different from the own apparatus.

The storage unit 602 includes, for example, a first buffer for retaining a transmission-waiting packet whose transmission source is the first apparatus and a second buffer for retaining a transmission-waiting packet whose transmission source is the second apparatus. The first buffer is, for example, the transmission buffer 340. The second buffer is, for example, the reception buffer 310. Consequently, the storage unit 602 can retain a transmission-waiting packet for a period of time after the packet is received by the communication unit 603 or generated by the own apparatus until the packet is transmitted by the communication unit 603.

The retention unit 601 stores correspondence information 103. The correspondence information 103 is information representative of a corresponding relationship between a hop number and a threshold value for a stay time period. The retention unit 601 stores for example, a correspondence information table 900 hereinafter described with reference to FIG. 9. Consequently, the retention unit 601 can store therein the correspondence information 103 that is used by the decision unit 605.

The correspondence information 103 may be information representative of a corresponding relationship among a hop number, a ratio at which a transmission-waiting packet whose transmission source is the first apparatus or the second apparatus is transmitted, and a threshold value for the stay time period. The retention unit 601 stores for example, a correspondence information table 900 hereinafter described with reference to FIG. 10. Consequently, the retention unit 601 can store the correspondence information 103 that is to be used by the decision unit 605 and corresponds to the ratio at which a transmission-waiting packet whose transmission source is the first apparatus or the second apparatus is transmitted.

Further, the correspondence information 103 may be information that associates a range of the hop number and a threshold value for the stay time period. The retention unit 601 stores, for example, a correspondence information table 900 hereinafter described with reference to FIG. 11. Consequently, the retention unit 601 can reduce the memory size of the correspondence information 103 that is used by the decision unit 605.

The communication unit 603 receives, for example, a transmission-waiting packet whose transmission source is the first apparatus or the second apparatus and inputs the transmission-waiting packet to the storage unit 602. Particularly, the communication unit 603 receives a packet whose transmission source is the own apparatus from the bus 200 of the own apparatus and inputs the packet as a transmission-waiting packet whose transmission source is the own apparatus to the transmission buffer 340. Further, the communication unit 603 receives a packet whose transmission source is a different information processing apparatus 100 from the network 210 and inputs the packet as a transmission-waiting packet whose transmission source is the different information processing apparatus 100 to the reception buffer 310. Consequently, the communication unit 603 can control transmission and reception of a packet to and from the different information processing apparatus 100.

Further, the communication unit 603 transmits a transmission-waiting packet that is stored in the storage unit 602 and whose transmission source is the first apparatus or another transmission-waiting packet that is stored in the storage unit 602 and whose transmission source is the second apparatus to the different information processing apparatus 100 or the bus 200 of the own apparatus in accordance with a predetermined ratio. For example, the communication unit 603 transmits a transmission-waiting packet that is retained in the transmission buffer 340 and whose transmission source is the own apparatus and another transmission-waiting packet that is retained in the reception buffer 310 and whose transmission source is the different information processing apparatus 100 in accordance with the predetermined ratio "1:1." Consequently, the communication unit 603 can control transmission and reception of a packet to and from the different information processing apparatus 100.

The measurement unit 604 measures a stay time period of a certain transmission-waiting packet whose transmission source is the second apparatus in the storage unit 602. For example, if a transmission-waiting packet whose transmission source is a different information processing apparatus 100 is inputted to the reception buffer 310, then the measurement unit 604 starts counting up of the counter value indicative of the stay time period of the packet. Consequently, the measurement unit 604 can acquire a stay time period of a packet that is used when the decision unit 605 decides whether or not congestion of packets or the like occurs with the own apparatus and a packet resides thereby.

The measurement unit 604 may calculate at least one of a minimum value, a maximum value and an average value of the stay time periods measured with regard to more than one packet from within a transmission-waiting packet group that is retained in the storage unit 602 and whose transmission source is the second apparatus. Consequently, the measurement unit 604 can acquire a parameter to be referred to when a cause of residence of a packet or the like is to be analyzed by a user of the computer system 500.

The measurement unit 604 may acquire, if a transmission-waiting packet whose transmission source is the second apparatus includes a hop number of the packet from the second apparatus to an information processing apparatus 100 at the preceding stage to the own apparatus, the hop number. Then, the measurement unit 604 calculates a value obtained by incrementing the acquired hop number as a hop number from the second apparatus to the own apparatus and updates the hop number included in the packet with the calculated hop number.

The decision unit 605 refers to the correspondence information 103 to decide whether or not the stay time period measured by the measurement unit 604 is equal to or longer than a threshold value corresponding to the hop number from the second apparatus to the own apparatus. The decision unit 605 decides, for example, whether or not the stay time period of a packet is equal to or longer than the threshold value corresponding to the hop number of the packet. If the stay time period is equal to or longer than the threshold value, then the decision unit 605 decides that there is the possibility that a packet may reside in the own apparatus. Consequently, the decision unit 605 can decide whether or not there is the possibility that a packet may reside in the own apparatus taking increase of the stay time period of a packet by degradation of the throughput in accordance with the hop number of the packet into consideration.

The decision unit 605 refers to the correspondence information 103 to decide whether or not the measured stay time period is equal to or longer than a threshold value corresponding to a combination of the calculated hop number and a predetermined ratio for transmission of the communication unit 603. For example, the correspondence information 103 sometimes is information representative of a corresponding relationship among a hop number, a ratio at which a transmission-waiting packet whose transmission source is the first apparatus or the second apparatus is transmitted, and a threshold value for the stay time period. In this case, the decision unit 605 decides whether or not the stay time period of the packet is equal to or longer than the threshold value corresponding to the hop number of the packet and the predetermined ratio for the transmission of the communication unit 603.

Consequently, also when the predetermined ratio for the transmission of the communication unit 603 is not "1:1," the decision unit 605 can take increase of the stay time period by degradation of the throughput in accordance with the combination of the hop number of the packet and the predetermined ratio for the transmission of the communication unit 603 into consideration. Further, the decision unit 605 can decide whether or not there is the possibility that a packet may have resided in the own apparatus taking increase of the stay time period of the packet by degradation of the throughput into consideration.

The decision unit 605 refers to the correspondence information 103 to decide whether or not the measured stay time period is equal to or longer than the threshold value corresponding to the range including the hop number from the second apparatus to the own apparatus. For example, if the correspondence information 103 is information that associates the range of the hop number and the threshold value for the stay time period, then the decision unit 605 decides whether or not the stay time period of the packet is equal to or longer than the threshold value corresponding to the range in which the hop number of the packet is included. Consequently, even if the memory size of the correspondence information 103 is reduced, the decision unit 605 can decide whether or not there is the possibility that a packet may have resided in the own apparatus.

The outputting unit 606 outputs, when the decision unit 605 decides that the stay time period of a certain packet is equal to or longer than the threshold value, information capable of identifying the certain packet. The information capable of identifying the packet is, for example, identification information of the packet, identification information of the transmission source or the destination of the packet, identification information of the job by which the packet is generated or the like. The outputting unit 606 transmits, for example, the information capable of identifying the packet to a different information processing apparatus 100, displays the information on a display unit, outputs the information to a printer so as to be printed or stores the information into a storage region such as the memory 202.

Particularly, if the decision unit 605 decides that the stay time period of a certain packet is equal to or longer than the threshold value, then the outputting unit 606 transmits information capable of identifying the packet to at least one of the transmission sources and the destination of the packet. Consequently, the outputting unit 606 can notify a user of the computer system 500 of the information capable of identifying the packet that may possibly have resided in the own apparatus.

Further, the outputting unit 606 can transmit, so as to transmit the information capable of identifying the certain packet to the transmission source of the certain packet, the information to the information processing apparatus 100 that has executed a job that is a generation source of the certain packet. Then, the user of the computer system 500 who caused the information processing apparatus 100 to execute the job that is a generation source of the certain packet can recognize in which information processing apparatus 100 there is the possibility that which packet may have resided when which job has been executed.

Particularly, if the decision unit 605 decides that the stay time period of a certain packet is equal to or longer than the threshold value, then the outputting unit 606 transmits the information capable of identifying the certain packet to the transmission source of the certain packet in accordance with a request from the transmission source. Consequently, since the outputting unit 606 need not perform a transmission process every time it is determined that the stay time period is equal to or longer than the threshold value, the outputting unit 606 can suppress increase of the communication amount in the computer system 500.

For example, if the decision unit 605 decides that the stay time period of a certain packet is equal to or longer than the threshold value, then the outputting unit 606 may output the information capable of identifying the certain packet and the measured stay time period in an associated relationship with each other. More particularly, the outputting unit 606 transmits a notification packet hereinafter described with reference to FIG. 13 to a different information processing apparatus 100 that is the transmission source or the destination of the packet whose stay time period is determined to be equal to or longer than the threshold value. Consequently, the outputting unit 606 can notify the user of the computer system 500 of a parameter to be referred to by the user when a cause by which the packet has resided or the like is to be analyzed.

The outputting unit 606 may output a result of the calculation by the measurement unit 604. For example, if the decision unit 605 decides that the stay time period of a certain packet is equal to or longer than the threshold value, then the outputting unit 606 adds the result of the calculation of the measurement unit 604 to the information capable of identifying the certain packet to generate a notification packet. Then, the outputting unit 606 transmits the generated notification packet to the different information processing apparatus 100 that is the transmission source or the destination of the certain packet. Consequently, the outputting unit 606 can notify the user of the computer system 500 of a parameter to be referred to by the user when a cause by which the packet has resided or the like is to be analyzed.

If the decision unit 605 decides that the stay time period of a certain packet from among a series of packets generated by one job is equal to or longer than the threshold value, then the outputting unit 606 outputs the information capable of identifying the certain packet after the communication unit 603 transmits the series of packets. Consequently, the outputting unit 606 transmits, collectively at a time for each job, information representing whether or not there is the possibility that a series of packets generated by the job may have resided. Therefore, increase of the communication amount in the computer system 500 can be suppressed.

The retention unit 601 and the storage unit 602 may be implemented, for example, if the operation described hereinabove is implemented by software, by a storage region such as the memory 202 depicted in FIG. 2. For example, where the operation of the information processing apparatus 100 is implemented by software, the function of the communication unit 603 may be implemented by causing the CPU 201 to execute a program stored in a storage region such as the memory 202 depicted in FIG. 2 or by the coupling apparatus 203.

Where the operation described above is implemented by software, the functions of the measurement unit 604, the decision unit 605 and the outputting unit 606 may be implemented by causing the CPU 201 to execute a program stored in a storage region such as the memory 202 depicted in FIG. 2 or by the coupling apparatus 203. For example, where the operation of the information processing apparatus 100 is implemented by software, a result of processing by the function units is stored into a storage region such as the memory 202 depicted in FIG. 2.

(Working Example of Computer System 500)

In the following, a working example of the computer system 500 is described with reference to FIG. 7

Figure 7:
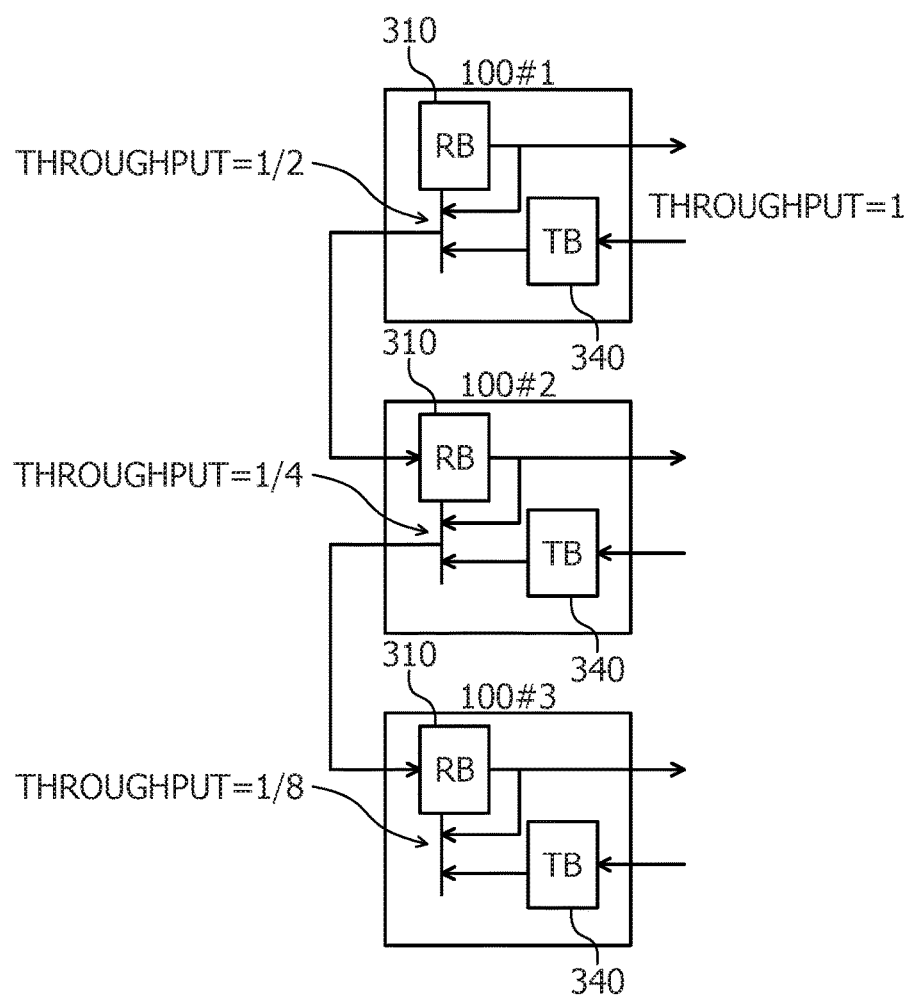
FIG. 7 is an explanatory view depicting a working example of a computer system.

FIG. 7 is an explanatory view depicting a working example of the computer system 500. Referring to FIG. 7, every time an information processing apparatus 100 receives a packet from the information processing apparatus 100 at the preceding stage, the information processing apparatus 100 inputs the received packet to one of the reception buffers 310 so as to be retained by the reception buffer 310. Further, the information processing apparatus 100 updates the reception side coordinate resistor 321, reception side counter register 322 and reception side packet ID register 323, which correspond to the reception buffer 310 by which the packet is retained.

Consequently, the information processing apparatus 100 can retain a transmission-waiting packet whose transmission source is the different information processing apparatus 100. Further, the information processing apparatus 100 can retain identification information, a transmission source coordinate and a destination coordinate of the transmission-waiting packet whose transmission source is the different information processing apparatus 100. Further, the information processing apparatus 100 can start counting up of the counter value indicative of the stay time period of a transmission-waiting packet whose transmission source is the different information processing apparatus 100.

Further, every time the information processing apparatus 100 generates a packet in the own apparatus, the information processing apparatus 100 inputs the generated packet to one of the transmission buffers 340 so as to be retained by the transmission buffer 340. Further, the information processing apparatus 100 updates a transmission side coordinate register 351, transmission side counter register 352 and transmission side packet ID register 353, which correspond to the transmission buffer 340 in which the packet is retained.

Consequently, the information processing apparatus 100 can retain a transmission-waiting packet whose transmission source is the own apparatus. Further, the information processing apparatus 100 can retain identification information, a transmission source coordinate and a destination coordinate of a transmission-waiting packet whose transmission source is the own apparatus. Further, the information processing apparatus 100 can start counting up of the counter value indicative of the stay time period of a transmission-waiting packet whose transmission source is the own apparatus. Here, the data structure of a packet is described with reference to FIG. 8.

(Data Structure of Packet 800)

Figure 8:
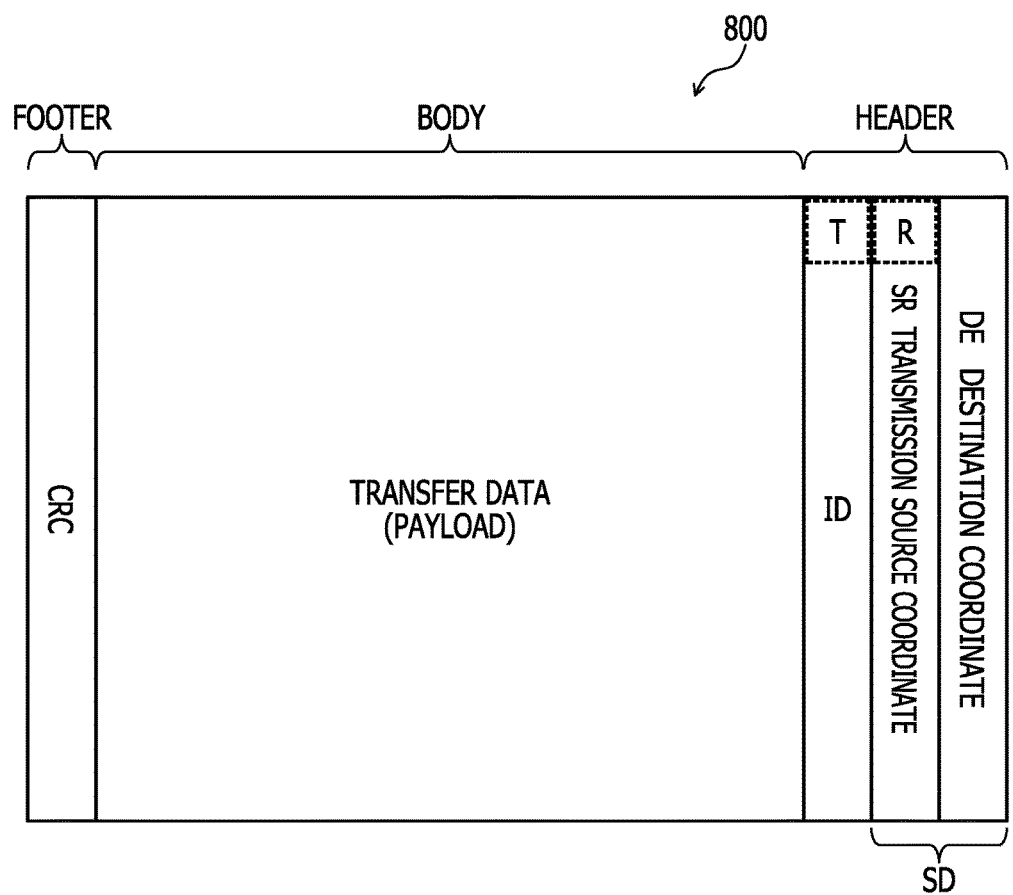
FIG. 8 is an explanatory view illustrating a data structure of a packet.

FIG. 8 is an explanatory view illustrating a data structure of the packet 800. Referring to FIG. 8, the packet 800 includes a cyclic redundancy code (CRC), transfer data, an ID, a transmission source coordinate, and a destination coordinate. The CRC is included in the footer part of the packet 800. The CRC is a code used for error detection of the packet 800. The transfer data are included in the body part of the packet 800. The transfer data are the substance of the packet 800. The ID is included in the header part. The ID is identification information of the packet 800.

The transmission source coordinate is included in the header part of the packet 800. The transmission source coordinate is a coordinate on the computer system 500 at which the transmission source of the packet 800 exists. The transmission source coordinate is, for example, identification information of the information processing apparatus 100 of transmission source. The destination coordinate is included in the header part of the packet 800. The destination coordinate is a coordinate on the computer system 500 at which the destination of the packet 800 exists. The destination coordinate is, for example, identification information of the information processing apparatus 100 of destination.

The packet 800 may include a flag T associated with the ID thereof. The flag T is information indicative of whether or not the packet 800 is a packet 800 at the tail end of a series of packets 800 divided from certain data. The packet 800 may include another flag R associated with the transmission source coordinate thereof. The flag R is information for requesting to transmit information that can identify a packet 800 determined to have a stay time period equal to or longer than the threshold value to the transmission source coordinate.

Further, the packet 800 may include a hop number (not illustrated) of the packet 800 itself. The hop number is incremented, every time the packet 800 passes an information processing apparatus 100, by the passed information processing apparatus 100. Consequently, the information processing apparatus 100 does not have to calculate the hop number on the basis of the own coordinate and the transmission source coordinate.

Referring back to FIG. 7, the information processing apparatus 100 transmits a transmission-waiting packet 800 retained in the reception buffer 310 and another transmission-waiting packet 800 retained in the transmission buffer 340 in accordance with a predetermined ratio to the bus 200 of the own apparatus or an information processing apparatus 100 at the succeeding stage. The predetermined ratio is, for example, "1:1."

The information processing apparatus 100 reads out, for example, a transmission-waiting packet 800 retained in the reception buffer 310 and another transmission-waiting packet 800 retained in the transmission buffer 340 at the predetermined ratio and acquires the destination of the read out transmission-waiting packets 800. Here, if the destination is the own apparatus, then the information processing apparatus 100 transmits the read out transmission-waiting packet 800 to the bus 200 of the own apparatus. On the other hand, if the destination is a different information processing apparatus 100, then the information processing apparatus 100 transmits the read out transmission-waiting packet 800 to an information processing apparatus 100 at the succeeding stage.

Here, the throughput of the information processing apparatuses 100#1 to 100#3 with regard to a transmission-waiting packet 800 whose transmission source is the information processing apparatus 100#1 is described. First, it is assumed that the throughput when a transmission-waiting packet 800 whose transmission source is the information processing apparatus 100#1 is inputted to and outputted from the transmission buffer 340 of the information processing apparatus 100#1 is "1 (reference value)."

At this time, from the information processing apparatus 100#1, transmission-waiting packets 800 retained in the transmission buffer 340 and the reception buffer 310 are transmitted in accordance with the predetermined ratio "1:1." In other words, the transmission-waiting packet 800 whose transmission source is the information processing apparatus 100#1 waits in the information processing apparatus 100#1 and is transmitted together with the transmission-waiting packet 800 whose transmission source is a different information processing apparatus 100. Therefore, the throughput when the transmission-waiting packet 800 whose transmission source is the information processing apparatus 100#1 is transmitted from the information processing apparatus 100#1 to the information processing apparatus 100#2 is reduced to one half, namely, to "½."

Further, the transmission-waiting packet 800 whose transmission source is the information processing apparatus 100#1 waits, also in the information processing apparatus 100#2, the transmission-waiting packet 800 whose transmission source is the information processing apparatus 100#2 and is transmitted together with the transmission-waiting packet 800 whose transmission source is the information processing apparatus 100#2. Therefore, the throughput when the transmission-waiting packet 800 whose transmission source is the information processing apparatus 100#1 is relayed by the information processing apparatus 100#2 and transmitted to the information processing apparatus 100#3 is further reduced by one half, namely to "¼."

Further, the transmission-waiting packet 800 whose transmission source is the information processing apparatus 100#1 waits, also in the information processing apparatus 100#3, the transmission-waiting packet 800 whose transmission source is the information processing apparatus 100#3 and is transmitted together with the transmission-waiting packet 800 whose transmission source is the information processing apparatus 100#3. Therefore, the throughput when the transmission-waiting packet 800 whose transmission source is the information processing apparatus 100#1 is relayed by the information processing apparatus 100#2 and the information processing apparatus 100#3 and is transmitted to the information processing apparatus 100#4 is further reduced by one half, namely, to "⅛."

In this manner, as the hop number of a packet 800 increases, the throughput decreases, and this gives rise to increase of the stay time period in the information processing apparatus 100. Therefore, the information processing apparatus 100 uses a threshold value, which differs depending upon the hop number of a packet 800, and compares the stay time period of the packet 800 and the threshold value with each other on the basis of the correspondence information table 900 hereinafter described with reference to FIG. 9.

On the other hand, when the predetermined ratio is not "1:1," the decreasing degree of the throughput by an increase of the hop number differs. Therefore, when the predetermined ratio is not "1:1," the information processing apparatus 100 may use a threshold value that differs depending upon the hop number on the basis of the correspondence information table 900 in accordance with the predetermined ratio described hereinafter with reference to FIG. 10. Further, the information processing apparatus 100 may use a threshold value that differs depending upon the range of the hop number on the basis of the correspondence information table 900 described hereinafter with reference to FIG. 11.

Here, the storage substance of the correspondence information table 900 is described with reference to FIGS. 9 to 11. The correspondence information table 900 is implemented, for example, by the threshold value retention circuit 332. Where the operation of the information processing apparatus 100 is implemented by software, the correspondence information table 900 may be implemented by a storage region such as the memory 202 depicted in FIG. 2.

(First Example of Storage Substance of Correspondence Information Table 900)

Figure 9:
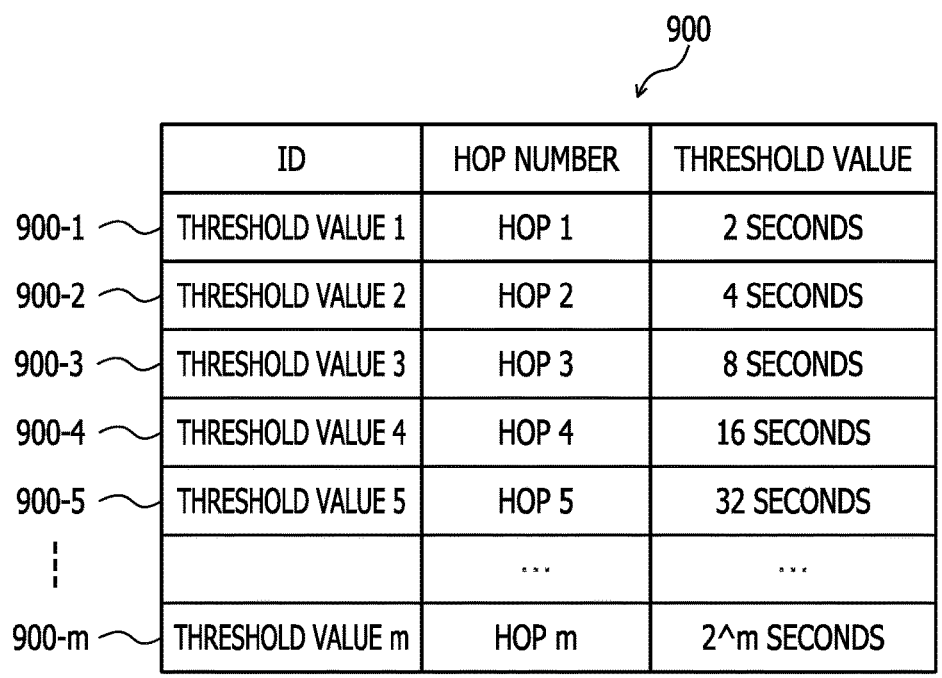
FIG. 9 is an explanatory view illustrating a first example of a storage substance of a correspondence information table.

FIG. 9 is an explanatory view illustrating a first example of the storage substance of the correspondence information table 900. In FIG. 9, an example of the storage substance of the correspondence information table 900 that is used when the predetermined ratio is "1:1" is illustrated.

As depicted in FIG. 9, the correspondence information table 900 includes fields for a hop number and a threshold value associated with a field for an ID. In the correspondence information table 900, the correspondence information 103 is stored as a record 900-a by setting information to the fields for each hop number. The character a here is a natural number. In the example of FIG. 9, the character a is a natural number from 1 to m. The character m is a maximum hop number in the computer system 500.

The ID signifies identification information of the correspondence information 103. The hop number represents the hop number of the packet 800. The threshold value signifies a threshold value corresponding to the hop number of the packet 800. For example, the record 900-a is the correspondence information 103 that associates the threshold value "$2^a$" with the hop number "a."

Consequently, the information processing apparatus 100 can discriminate whether the stay time period of the packet 800 is a stay time period in the case of the throughput in accordance with the hop number or a stay time period when the packet resides in the own apparatus. Further, the information processing apparatus 100 may use, if the transmission buffer 340 includes a plurality of stages, a value obtained by multiplying the threshold value corresponding to the hop number by the number of stages as the threshold value for comparison with the stay time period of the packet 800.

(Second Example of Storage Substance of Correspondence Information Table 900)

Figure 10:
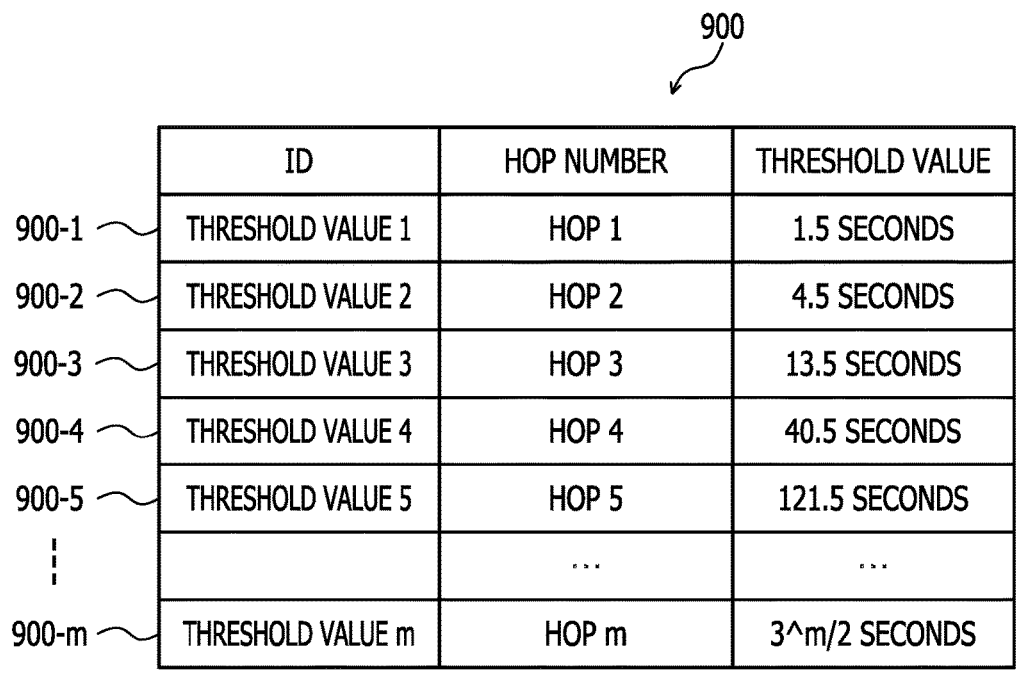
FIG. 10 is an explanatory view illustrating a second example of the storage substance of the correspondence information table.

FIG. 10 is an explanatory view illustrating a second example of the storage substance of the correspondence information table 900. In FIG. 10, an example of the storage substance of the correspondence information table 900 that is used when the predetermined ratio is not "1:1" is illustrated. In particular, an example of the storage substance of the correspondence information table 900 that is used when the predetermined ratio is "2:1" is illustrated in FIG. 10.

As depicted in FIG. 10, the correspondence information table 900 includes fields for a hop number and a threshold value associated with a field for an ID. In the correspondence information table 900, the correspondence information 103 is stored as a record 900-a by setting information to the fields for each hop number. The character a here is a natural number. In the example of FIG. 10, the character a is a natural number from 1 to m. The character m is a maximum hop number in the computer system 500.

The ID signifies identification information of the correspondence information 103. The hop number represents a hop number of the packet 800. The threshold value signifies a threshold value corresponding to the hop number of the packet 800. For example, the record 900-a is the correspondence information 103 that associates the threshold value "$3^a/2$" with the hop number "a."

Consequently, the information processing apparatus 100 can store the correspondence information 103 that can be applied to a case in which the predetermined ratio between the transmission buffer 340 and the reception buffer 310 is "2:1." In other words, the information processing apparatus 100 can store the correspondence information 103 that can be applied to a case in which the throughput degrades by "⅓" as the hop number increases.

Thus, the information processing apparatus 100 can discriminate whether the stay time period of the packet 800 is the stay time period in the case of the throughput in accordance with the hop number or the stay time period when the packet resides in the own apparatus. Further, the information processing apparatus 100 may use, if the transmission buffer 340 includes a plurality of stages, a value obtained by multiplying the threshold value corresponding to the hop number by the number of stages as the threshold value for comparison with the stay time period of the packet 800.

(Third Example of Storage Substance of Correspondence Information Table 900)

FIG. 11 is an explanatory view illustrating a third example of the storage substance of the correspondence information table 900. In FIG. 11, an example of the storage substance of the correspondence information table 900 in which a threshold value is associated for each range of the hop number is illustrated.

As depicted in FIG. 11, the correspondence information table 900 includes fields for a hop number group and a threshold value associated with a field for an ID. In the correspondence information table 900, the correspondence information 103 is stored as a record 900-a by setting information to the fields for each hop number group. The character a here is a natural number. In the example of FIG. 11, the character a is a natural number from 1 to m. The character m is a maximum hop number in the computer system 500.

The ID signifies identification information of the correspondence information 103. The hop number group represents a group including a plurality of hop numbers of the packet 800. The threshold value signifies a threshold value corresponding to the hop number group of the packet 800. For example, the record 900-a is the correspondence information 103 that associates the threshold value "$2^{(3 \times a)}$" with the hop number group "#a" of the hop numbers "(3×a−2) to (3×a)." Consequently, since the information processing apparatus 100 need not store the threshold value for each of hop numbers, the memory size of the correspondence information table 900 can be reduced.

Referring back to FIG. 7, a flow of comparison between the stay time period of a packet 800 whose transmission source is the information processing apparatus 100#1 and the threshold value is described taking a case in which the information processing apparatus 100 includes reception buffers 310 of eight stages and transmission buffers 340 of eight stages as an example. The reception buffer 310 and the transmission buffer 340 are buffers for 1 kilo byte (KB) for each stage.

Here, the information processing apparatus 100#1 transmits a packet 800, which is obtained by dividing data of 5 KB for each 1 KB and whose transmission source is the information processing apparatus 100#1, to the information processing apparatus 100#3 through the information processing apparatus 100#2. Further, the information processing apparatus 100#2 similarly transmits a packet 800, which is obtained by dividing data of 5 KB for each 1 KB and whose transmission source is the information processing apparatus 100#2, to the information processing apparatus 100#4.

In this case, the information processing apparatus 100#2 alternately transmits the packet 800 whose transmission source is the information processing apparatus 100#1 and the packet 800 whose transmission source is the information processing apparatus 100#2 to the information processing apparatus 100#3. Further, the stay time period of the packet 800 whose transmission source is the information processing apparatus 100#1 is compared with the threshold value corresponding to the hop number "1."

Further, if the stay time period of the packet 800 whose transmission source is the information processing apparatus 100#1 is equal to or longer than the threshold value, then a notification packet that includes information capable of identifying the packet 800 whose transmission source is the information processing apparatus 100#1 is generated. Then, the notification packet is transmitted from the information processing apparatus 100#2 to the information processing apparatus 100#1 that is the transmission source of the packet 800 whose stay time period is determined to be equal to or longer than the threshold value or to the information processing apparatus 100#3 that is the destination.

In this case, from the information processing apparatus 100#3, the packet 800 whose transmission source is the information processing apparatus 100#1 is transmitted alternately with the packet 800 whose transmission source is the information processing apparatus 100#2 to the bus 200 of the information processing apparatus 100#3 or to the information processing apparatus 100#4. Further, the stay time period of the packet 800 whose transmission source is the information processing apparatus 100#1 is compared with the threshold value corresponding to the hop number "2."

Further, if the stay time period of the packet 800 whose transmission source is the information processing apparatus 100#1 is equal to or longer than the threshold value, then a notification packet that includes information capable of identifying the packet 800 whose transmission source is the information processing apparatus 100#1 is generated. Then, the notification packet is transmitted from the information processing apparatus 100#3 to the information processing apparatus 100#1 that is the transmission source of the packet 800 whose stay time period is determined to be equal to or longer than the threshold value or to the bus 200 of the information processing apparatus 100#3 that is the destination. Now, an example in which the stay time period of a packet 800 is compared with a threshold value is described with reference to FIG. 12.

(Example of Comparison Between Stay Time Period of Packet 800 and Threshold Value)

Figure 12:
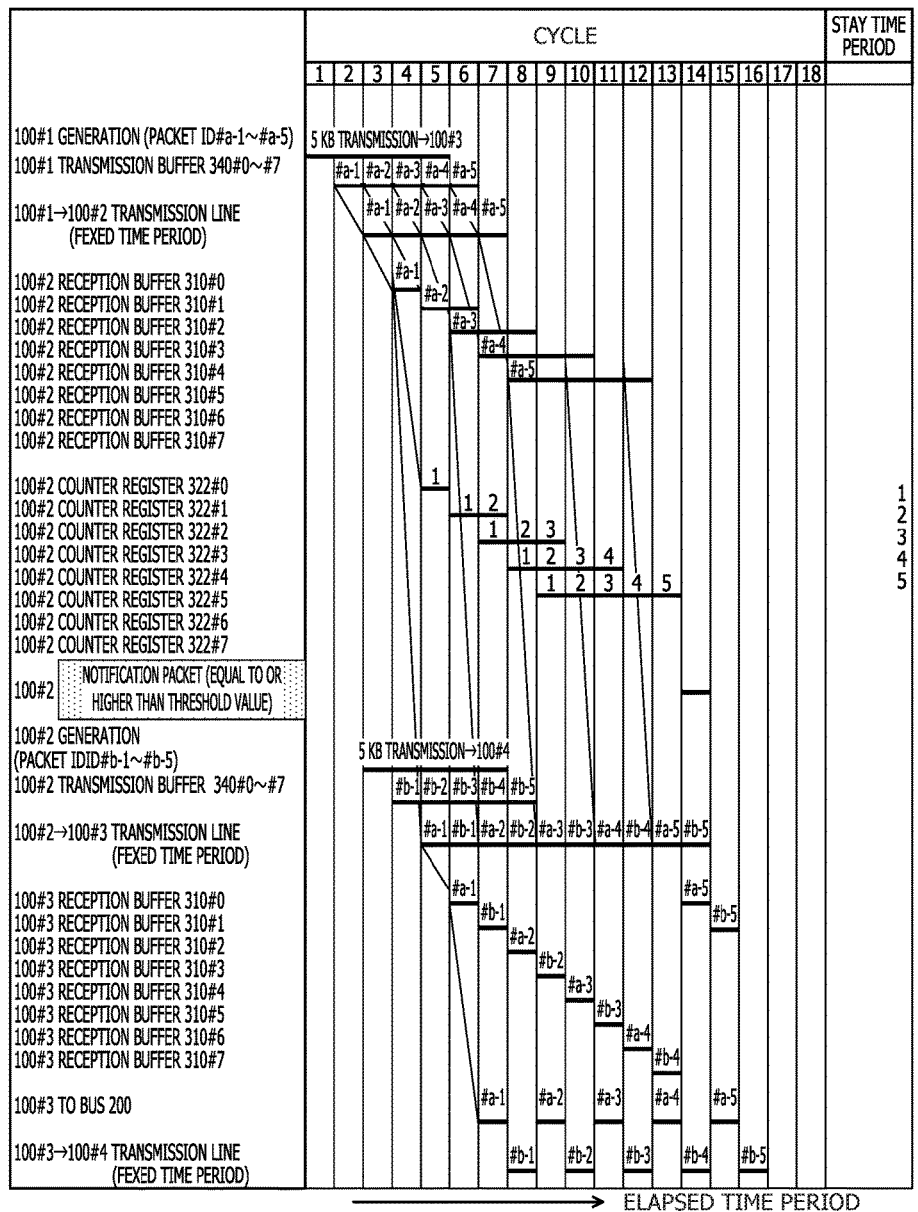
FIG. 12 is an explanatory view illustrating an example of comparison between a stay time period of a packet and a threshold value.

FIG. 12 is an explanatory view illustrating an example of comparison between the stay time period of a packet 800 and a threshold value. Referring to FIG. 12, an example in which the stay time period in the information processing apparatus 100#2 is compared with a threshold value is described. However, the description of an example of comparison between the stay time period in the information processing apparatus 100#3 and a threshold value is omitted.

In the first cycle, the information processing apparatus 100#1 divides the first data of 1 KB from within data of 5 KB to generate a packet 800 to which a packet ID "#a−1" is applied.

In the second cycle, the information processing apparatus 100#1 divides the second data of 1 KB from within the data of 5 KB to generate a packet 800 to which another packet ID "#a−2" is applied. Further, the information processing apparatus 100#1 inputs the packet 800 to which the packet ID "#a−1" is applied to the transmission buffer 340#0.

In the third cycle, the information processing apparatus 100#1 divides the third data of 1 KB from within the data of 5 KB to generate a packet 800 to which a further packet ID "#a−3" is applied. Further, the information processing apparatus 100#1 inputs the packet 800 to which the packet ID "#a−2" is applied to the transmission buffer 340#1. Further, the information processing apparatus 100#1 outputs the packet 800 to which the packet ID "#a−1" is applied to the transmission line to the information processing apparatus 100#2. The information processing apparatus 100#2 divides the first data of 1 KB from within data of 5 KB to generate a packet 800 to which a packet ID "#b−1" is applied.

In the fourth cycle, the information processing apparatus 100#1 divides the fourth data of 1 KB from within the data of the 5 KB to generate a packet 800 to which a packet ID "#a-4" is applied. Further, the information processing apparatus 100#1 inputs the packet 800 to which the packet ID "#a-3" is applied to the transmission buffer 340#2. Further, the information processing apparatus 100#1 outputs the packet 800 to which the packet ID "#a-2" is applied to the transmission line to the information processing apparatus 100#2.

The information processing apparatus 100#2 inputs the packet 800 to which the packet ID "#a-1" is applied to the reception buffer 310#0. Further, the information processing apparatus 100#2 divides the second data of 1 KB from within the data of 5 KB to generate a packet 800 to which a packet ID "#b-2" is applied. Further, the information processing apparatus 100#2 inputs the packet 800 to which the packet ID "#b-1" is applied to the transmission buffer 340#0.

In the fifth cycle, the information processing apparatus 100#1 divides the fifth data of 1 KB from within the data of the 5 KB to generate a packet 800 to which a packet ID "#a-5" is applied. Further, the information processing apparatus 100#1 inputs the packet 800 to which the packet ID "#a-4" is applied to the transmission buffer 340#3. Further, the information processing apparatus 100#1 outputs the packet 800 to which the packet ID "#a-3" is applied to the transmission line to the information processing apparatus 100#2.

The information processing apparatus 100#2 inputs the packet 800 to which the packet ID "#a-2" is applied to the reception buffer 310#1. Further, the information processing apparatus 100#2 counts up the counter value of the reception side counter register 322#0 corresponding to the reception buffer 310#0 to "1."

Further, the information processing apparatus 100#2 divides the third data of 1 KB from within the data of 5 KB to generate a packet 800 to which a packet ID "#b-3" is applied. Further, the information processing apparatus 100#2 inputs the packet 800 to which the packet ID "#b-2" is applied to the transmission buffer 340#1. Furthermore, the information processing apparatus 100#2 outputs the packet 800 to which the packet ID "#a-1" is applied to the transmission line to the information processing apparatus 100#3.

Here, the information processing apparatus 100#2 decides whether or not the counter value of the reception side counter register 322#0 corresponding to the outputted packet 800 to which the packet ID "#a-1" is applied is equal to or higher than a threshold value. If the counter value is equal to or higher than the threshold value, then the information processing apparatus 100#2 generates a notification packet on the basis of the corresponding transmission side coordinate register 351#0 and the transmission side packet ID register 353#0.

Here, the information processing apparatus 100#2 transmits the notification packet after transmitting the packet IDs "#a-1" to "#a-5" in order to reduce the communication amount. The information processing apparatus 100#2 may transmit a notification packet every time the notification packet is generated. A data structure of the notification packet is hereinafter described with reference to FIG. 13.

In the sixth cycle, the information processing apparatus 100#1 inputs the packet 800 to which the packet ID "#a-5" is applied to the transmission buffer 340#4. Further, the information processing apparatus 100#1 outputs the packet 800 to which the packet ID "#a-4" is applied to the transmission line to the information processing apparatus 100#2.

The information processing apparatus 100#2 inputs the packet 800 to which the packet ID "#a-3" is applied to the reception buffer 310#2. Further, the information processing apparatus 100#2 counts up the counter value of the reception side counter register 322#1 corresponding to the reception buffer 310#1 to "1."

Further, the information processing apparatus 100#2 divides the fourth data of 1 KB from within the data of 5 KB to generate a packet 800 to which a packet ID "#b-4" is applied. Further, the information processing apparatus 100#2 inputs the packet 800 to which the packet ID "#b-3" is applied to the transmission buffer 340#2. Furthermore, the information processing apparatus 100#2 outputs the packet 800 to which the packet ID "#b-1" is applied to the transmission line to the information processing apparatus 100#3. Consequently, the stay time period of the packet 800 to which the packet ID "#a-2" is applied increases.

The information processing apparatus 100#3 inputs the packet 800 to which the packet ID "#a-1" is applied to the reception buffer 310#0.

In the seventh cycle, the information processing apparatus 100#1 outputs the packet 800 to which the packet ID "#a-5" is applied to the transmission line to the information processing apparatus 100#2.

The information processing apparatus 100#2 inputs the packet 800 to which the packet ID "#a-4" is applied to the reception buffer 310#3. Further, the information processing apparatus 100#2 counts up the counter value of the reception side counter register 322#2 corresponding to the reception buffer 310#2 to "1." Further, the information processing apparatus 100#2 counts up the counter value of the reception side counter register 322#1 corresponding to the reception buffer 310#1 to "2."

Here, if the counter value of the reception side counter register 322#1 is equal to or higher than the threshold value, then the information processing apparatus 100#2 generates a notification packet on the basis of the corresponding transmission side coordinate register 351#1 and the transmission side packet ID register 353#1.

Further, the information processing apparatus 100#2 divides the fifth data of 1 KB from within the data of 5 KB to generate a packet 800 to which a packet ID "#b-5" is applied. Further, the information processing apparatus 100#2 inputs the packet 800 to which the packet ID "#b-4" is applied to the transmission buffer 340#3. Furthermore, the information processing apparatus 100#2 outputs the packet 800 to which the packet ID "#a-2" is applied to the transmission line to the information processing apparatus 100#3.

Here, the information processing apparatus 100#2 decides whether or not the counter value of the reception side counter register 322#1 corresponding to the outputted packet 800 to which the packet ID "#a-2" is applied is equal to or higher than the threshold value. If the counter value is equal to or higher than the threshold value, then the information processing apparatus 100#2 generates a notification packet on the basis of the corresponding transmission side coordinate register 351#1 and the transmission side packet ID register 353#1.

The information processing apparatus 100#3 inputs the packet 800 to which the packet ID "#b-1" is applied to the reception buffer 310#1. Further, the information processing apparatus 100#3 outputs the packet 800 to which the packet ID "#a-1" is applied to the bus 200 of the own apparatus.

In the eighth cycle, the information processing apparatus 100#2 inputs the packet 800 to which the packet ID "#a-5" is applied to the reception buffer 310#4. Further, the information processing apparatus 100#2 counts up the counter value of the reception side counter register 322#3 corresponding to the reception buffer 310#3 to "1." Further, the information processing apparatus 100#2 counts up the counter value of the reception side counter register 322#2 corresponding to the reception buffer 310#2 to "2."

Further, the information processing apparatus 100#2 inputs the packet 800 to which the packet ID "#b-5" is applied to the transmission buffer 340#4. Further, the information processing apparatus 100#2 outputs the packet 800 to which the packet ID "#b-2" is applied to the transmission line to the information processing apparatus 100#3.

The information processing apparatus 100#3 inputs the packet 800 to which the packet ID "#a-2" is applied to the reception buffer 310#0. Further, the information processing apparatus 100#3 outputs the packet 800 to which the packet ID "#b-1" is applied to the transmission line to the information processing apparatus 100#4.

In the ninth cycle, the information processing apparatus 100#2 counts up the counter value of the reception side counter register 322#4 corresponding to the reception buffer 310#4 to "1." Further, the information processing apparatus 100#2 counts up the counter value of the reception side counter register 322#3 corresponding to the reception buffer 310#3 to "2." Further, the information processing apparatus 100#2 counts up the counter value of the reception side counter register 322#2 corresponding to the reception buffer 310#2 to "3." Further, the information processing apparatus 100#2 outputs the packet 800 to which the packet ID "#a-3" is applied to the transmission line to the information processing apparatus 100#3.

Here, the information processing apparatus 100#2 decides whether or not the counter value of the reception side counter register 322#2 corresponding to the outputted packet 800 to which the packet ID "#a-2" is applied is equal to or higher than the threshold value. If the counter value is equal to or higher than the threshold value, then the information processing apparatus 100#2 generates a notification packet on the basis of the corresponding transmission side coordinate register 351#2 and the transmission side packet ID register 353#2.

The information processing apparatus 100#3 inputs the packet 800 to which the packet ID "#b-2" is applied to the reception buffer 310#3. Further, the information processing apparatus 100#3 outputs the packet 800 to which the packet ID "#a-2" is applied to the bus 200 of the own apparatus.

In the tenth cycle, the information processing apparatus 100#2 counts up the counter value of the reception side counter register 322#4 corresponding to the reception buffer 310#4 to "2." Further, the information processing apparatus 100#2 counts up the counter value of the reception side counter register 322#3 corresponding to the reception buffer 310#3 to "3." Further, the information processing apparatus 100#2 outputs the packet 800 to which the packet ID "#b-3" is applied to the transmission line to the information processing apparatus 100#3.

The information processing apparatus 100#3 inputs the packet 800 to which the packet ID "#a-3" is applied to the reception buffer 310#4. Further, the information processing apparatus 100#3 outputs the packet 800 to which the packet ID "#b-2" is applied to the transmission line to the information processing apparatus 100#4.

In the eleventh cycle, the information processing apparatus 100#2 counts up the counter value of the reception side counter register 322#4 corresponding to the reception buffer 310#4 to "3." Further, the information processing apparatus 100#2 counts up the counter value of the reception side counter register 322#3 corresponding to the reception buffer 310#3 to "4." Further, the information processing apparatus 100#2 outputs the packet 800 to which the packet ID "#a-4" is applied to the transmission line to the information processing apparatus 100#3.

Here, the information processing apparatus 100#2 decides whether or not the counter value of the reception side counter register 322#3 corresponding to the outputted packet 800 to which the packet ID "#a-2" is applied is equal to or higher than the threshold value. If the counter value is equal to or higher than the threshold value, then the information processing apparatus 100#2 generates a notification packet on the basis of the corresponding transmission side coordinate register 351#3 and the transmission side packet ID register 353#3.

The information processing apparatus 100#3 inputs the packet 800 to which the packet ID "#b-3" is applied to the reception buffer 310#5. Further, the information processing apparatus 100#3 outputs the packet 800 to which the packet ID "#a-3" is applied to the bus 200 of the own apparatus.

In the twelfth cycle, the information processing apparatus 100#2 counts up the counter value of the reception side counter register 322#4 corresponding to the reception buffer 310#4 to "4." Further, the information processing apparatus 100#2 outputs the packet 800 to which the packet ID "#b-4" is applied to the transmission line to the information processing apparatus 100#3.

The information processing apparatus 100#3 inputs the packet 800 to which the packet ID "#a-4" is applied to the reception buffer 310#6. Further, the information processing apparatus 100#3 outputs the packet 800 to which the packet ID "#b-3" is applied to the transmission line to the information processing apparatus 100#4.

In the thirteenth cycle, the information processing apparatus 100#2 counts up the counter value of the reception side counter register 322#4 corresponding to the reception buffer 310#4 to "5." Further, the information processing apparatus 100#2 outputs the packet 800 to which the packet ID "#a-5" is applied to the transmission line to the information processing apparatus 100#3.

Here, the information processing apparatus 100#2 decides whether or not the counter value of the reception side counter register 322#4 corresponding to the outputted packet 800 to which the packet ID "#a-2" is applied is equal to or higher than the threshold value. If the counter value is equal to or higher than the threshold value, then the information processing apparatus 100#2 generates a notification packet on the basis of the corresponding transmission side coordinate register 351#4 and the transmission side packet ID register 353#4.

The information processing apparatus 100#3 inputs the packet 800 to which the packet ID "#b-4" is applied to the reception buffer 310#7. Further, the information processing apparatus 100#3 outputs the packet 800 to which the packet ID "#a-4" is applied to the bus 200 of the own apparatus.

In the fourteenth cycle, the information processing apparatus 100#2 outputs the packet 800 to which the packet ID "#b-5" is applied to the transmission line to the information processing apparatus 100#3. Further, if a notification packet is generated, then the information processing apparatus 100#2 transmits the generated notification packet to the information processing apparatus 100#1.

The information processing apparatus 100#3 inputs the packet 800 to which the packet ID "#a-5" is applied to the reception buffer 310#0. Further, the information processing apparatus 100#3 outputs the packet ID "#b-4" is applied to the transmission line to the information processing apparatus 100#4.

In the fifteenth cycle, the information processing apparatus 100#3 inputs the packet 800 to which the packet ID "#b-5" is applied to the reception buffer 310#1. Further, the information processing apparatus 100#3 outputs the packet 800 to which the packet ID "#a-5" is applied to the bus 200 of the own apparatus.

In the sixteenth cycle, the information processing apparatus 100#3 outputs the packet 800 to which the packet ID "#b-5" is applied to the transmission line to the information processing apparatus 100#4. In the following, a data structure of the notification packet is described with reference to FIG. 13.

(Data Structure of Notification Packet 1300)

Figure 13:
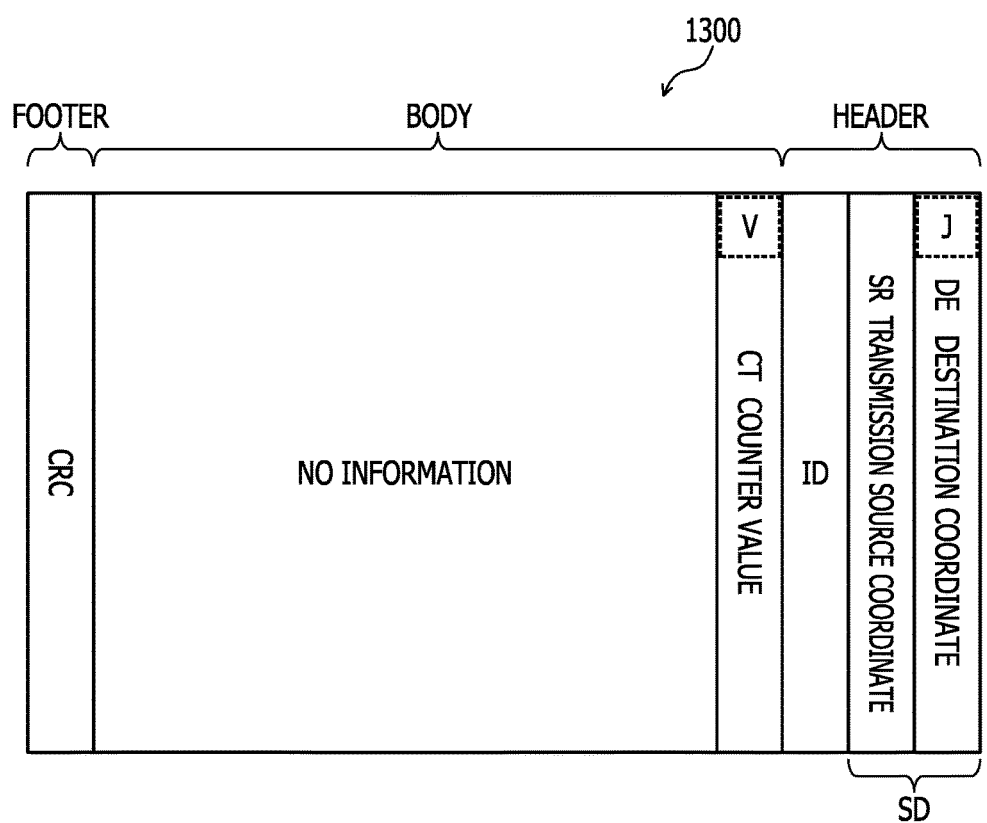
FIG. 13 is an explanatory view illustrating a data structure of a notification packet.

FIG. 13 is an explanatory view illustrating the data structure of the notification packet 1300. Referring to FIG. 13, the notification packet 1300 includes a CRC, a counter value, an ID, a transmission source coordinate and a destination coordinate.

The CRC is included in the footer part of the notification packet 1300. The CRC is a code used for error detection of the notification packet 1300. The counter value is included in the body part of the notification packet 1300. The counter value is a measurement time period within which the counter value is equal to or higher than a threshold value. The ID is included in the header part of the notification packet 1300. The ID is identification information of the notification packet 1300.

The transmission source coordinate is included in the header part of the notification packet 1300. The transmission source coordinate is a coordinate on the computer system 500 at which the transmission source of the notification packet 1300 exists. The transmission source coordinate is, for example, identification information of the own apparatus that becomes a transmission source. The destination coordinate is included in the header part of the notification packet 1300. The destination coordinate is a coordinate on the computer system 500 at which the destination of the notification packet 1300 exists. The destination coordinate is, for example, identification information of the information processing apparatus 100 of the destination and is identification information of the information processing apparatus 100 that is the transmission source of the packet 800 whose counter value is determined to be equal to or higher than the threshold value.

Further, the notification packet 1300 may include a flag V associated with the counter value. The flag V is information indicative of whether or not a counter value is set already in the notification packet 1300. Further, the notification packet 1300 may include a flag J associated with the destination coordinate. The flag J is information indicating that the packet is the notification packet 1300.

(Different Example of Coupling Apparatus 203)

Now, a different example of the coupling apparatus 203 is described with reference to FIG. 14.

Figure 14:
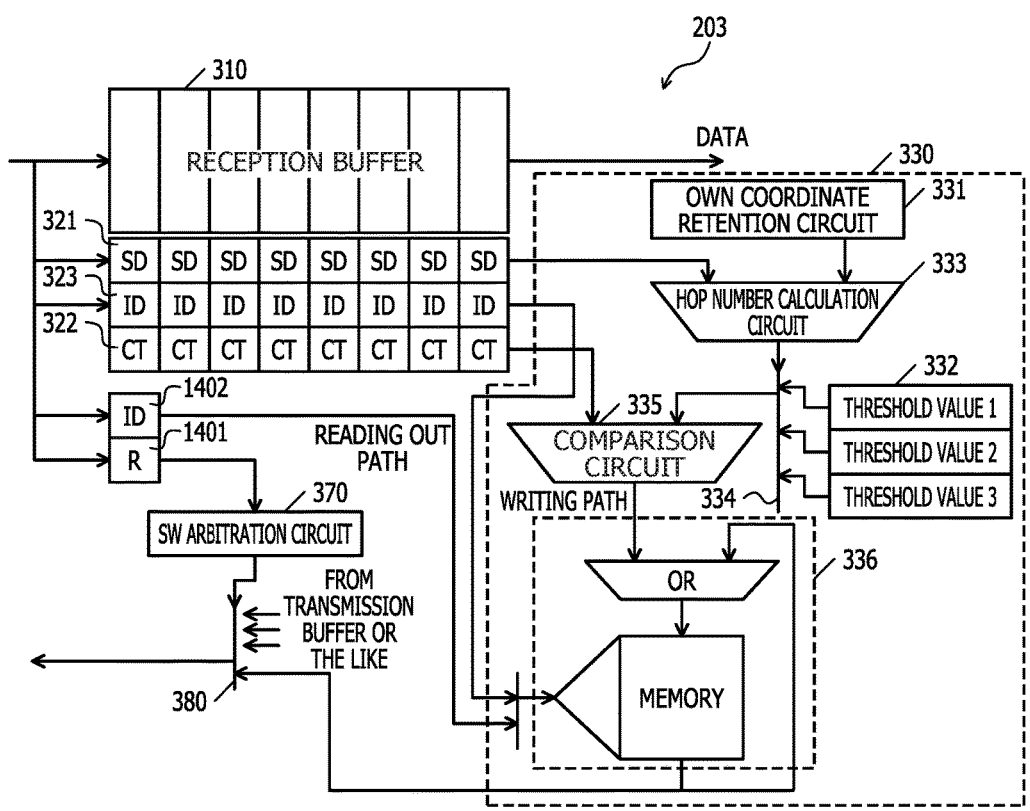
FIG. 14 is an explanatory view depicting a different example of the coupling apparatus.

FIG. 14 is an explanatory view depicting a different example of the coupling apparatus 203. Referring to FIG. 14, similarly as in FIG. 3, the coupling apparatus 203 includes reception buffers 310#1 to 310#n. Further, the coupling apparatus 203 includes reception side coordinate registers 321#1 to 321#n, reception side counter registers 322#1 to 322#n, and reception side packet ID registers 323#1 to 323#n similarly as in FIG. 3. Further, the coupling apparatus 203 includes a reception side stay time period notification circuit 330 similarly as in FIG. 3.

Further, though not depicted, the coupling apparatus 203 includes transmission buffers 340#1 to 340#n similarly as in FIG. 3. Further, though not depicted, the coupling apparatus 203 includes transmission side coordinate registers 351#1 to 351#n, transmission side counter registers 352#1 to 352#n, and transmission side packet ID registers 353#1 to 353#n similarly as in FIG. 3. Further, though not depicted, the coupling apparatus 203 includes a transmission side stay time period notification circuit 360 similarly as in FIG. 3. Further, the coupling apparatus 203 includes an arbitration circuit 370 and a transmission circuit 380.

In the example of FIG. 14, the coupling apparatus 203 further includes a request register 1401 and a request ID register 1402. The request register 1401 is a register for retaining a notification request for a stay time period. The request ID register 1402 is a register for retaining identification information of a packet 800 with regard to which a notification request for a stay time period is issued.

The reception side stay time period notification circuit 330 includes, similarly as in FIG. 3, an own coordinate retention circuit 331, a threshold value retention circuit 332, a hop number calculation circuit 333, a threshold value selection circuit 334, a comparison circuit 335, and a generation circuit 336. In the example of FIG. 14, the generation circuit 336 includes a memory and an OR circuit. The generation circuit 336 couples, by the OR circuit thereof, a result of comparison by the comparison circuit 335 and the substance of the memory with each other and overwrites the substance of the memory with the result of the coupling. Consequently, the generation circuit 336 can accumulate a result of comparison inputted thereto from the comparison circuit 335 in the memory.

The generation circuit 336 generates, when a notification request is inputted thereto from the request register 1401, a notification packet 1300 on the basis of a comparison result regarding a packet 800 indicated by identification information inputted from the request ID register 1402 from among comparison results accumulated in the memory. After the generation circuit 336 generates the notification packet 1300, the generation circuit 336 outputs the notification packet 1300 to the transmission circuit 380 so as to be transmitted to a different information processing apparatus 100.

In this manner, the coupling apparatus 203 generates and transmits, after a notification request for a stay time period is inputted, a notification packet 1300. However, the coupling apparatus 203 does not generate a notification packet 1300 if a notification request for a stay time period is not inputted thereto. Consequently, the coupling apparatus 203 can reduce the communication amount and suppress congestion of the network 210.

(Different Example of Computer System 500)

Now, a different example of the computer system 500 is described with reference to FIG. 15.

Figure 15:
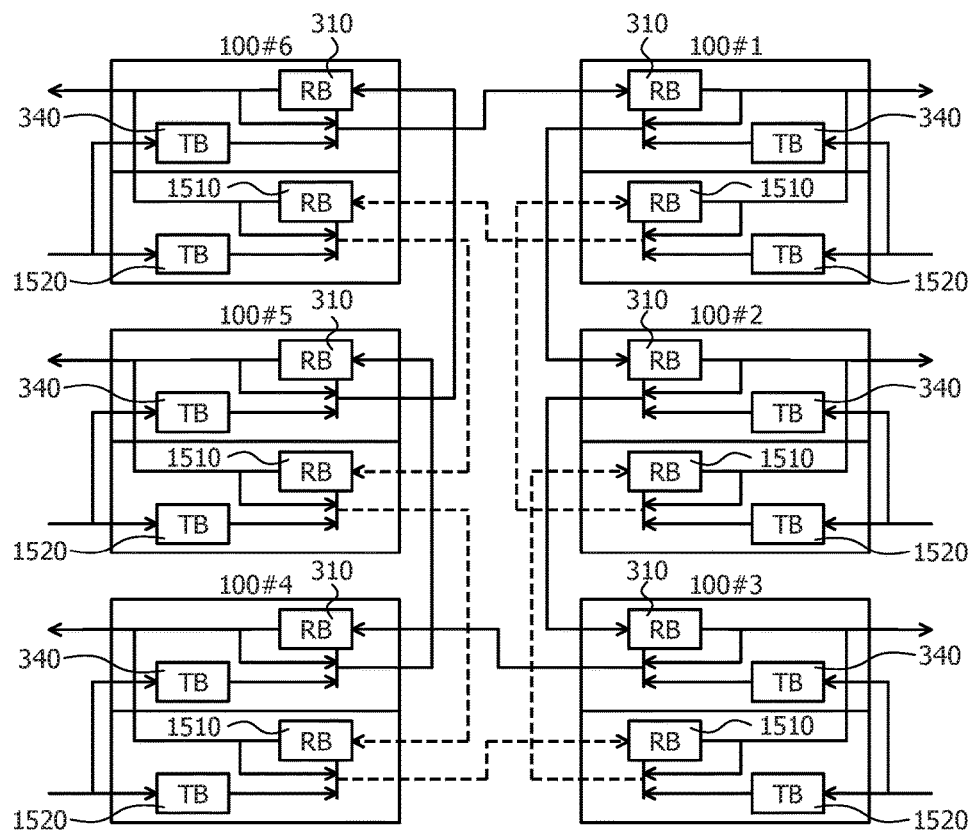
FIG. 15 is an explanatory view depicting a different example of the computer system.

FIG. 15 is an explanatory view depicting a different example of the computer system 500. As depicted in FIG. 15, the different example of the computer system 500 is a system in which x information processing apparatuses 100 are coupled for bidirectional communication with each other on a Ring network. In the example of FIG. 15, x is 6.

In the different example of the computer system 500, each information processing apparatus 100 includes, in addition to a transmission buffer 340 and a reception buffer 310, a notification transmission buffer 1520 and a notification reception buffer 1510 for retaining a transmission-waiting notification packet 1300. Here, the information processing apparatus 100 transmits a notification packet 1300 in the opposite direction to that of a packet 800.

In the different example of the computer system 500, an information processing apparatus 100 receives a packet 800 from an information processing apparatus 100 at the preceding stage and retains the received transmission-waiting packet 800 in the reception buffer 310. The information processing apparatus 100 retains a transmission-waiting packet 800 generated by an own apparatus into the transmission buffer 340. The information processing apparatus 100 transmits a transmission-waiting packet 800 retained in the transmission buffer 340 or a transmission-waiting packet 800 retained in the reception buffer 310 to the bus 200 of the own apparatus or to an information processing apparatus 100 at the succeeding stage in accordance with a predetermined ratio.

Further, the information processing apparatus 100 receives a notification packet 1300 from the information processing apparatus 100 at the succeeding stage and retains the received transmission-waiting notification packet 1300 into the notification reception buffer 1510. The information processing apparatus 100 retains a transmission-waiting notification packet 1300 generated by the own apparatus into the notification transmission buffer 1520. The information processing apparatus 100 reads out the transmission-waiting notification packet 1300 retained in the notification transmission buffer 1520 or the transmission-waiting notification packet 1300 retained in the notification reception buffer 1510 in accordance with the predetermined ratio. Then, the information processing apparatus 100 transmits the read out notification packet 1300 to the bus 200 of the own apparatus or the information processing apparatus 100 at the preceding stage.

With the different example of the computer system 500, since the paths for the packet 800 and the notification packet 1300 are different from each other, such a situation that transmission and reception of packets 800 congest can be prevented by transmitting a notification packet 1300.

(Data Structure of Notification Packet 1300 in Different Example of Computer System 500)

Now, an example of a data structure of the notification packet 1300 in the different example of a computer system 500 depicted in FIG. 15 is described with reference to FIG. 16.

Figure 16:
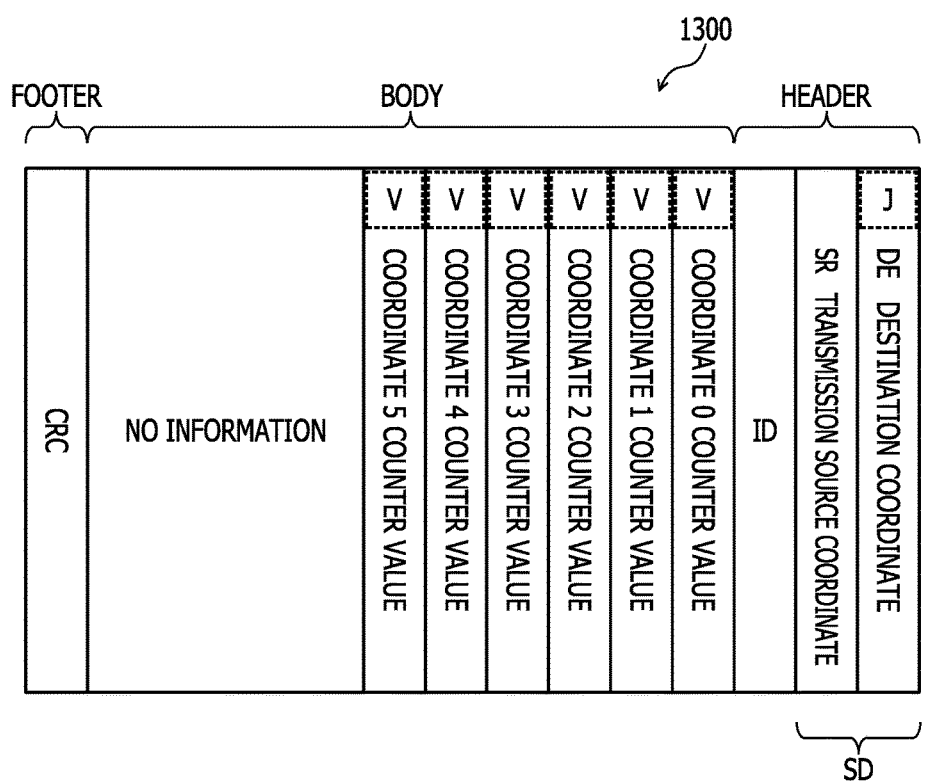
FIG. 16 is an explanatory view illustrating an example of a data structure of a notification packet in the different example of the computer system.

FIG. 16 is an explanatory view illustrating an example of the data structure of the notification packet 1300 in the different example of the computer system 500. Referring to FIG. 16, the notification packet 1300 includes a CRC, and a counter value, an ID, a transmission source coordinate and a destination coordinate for each information processing apparatus 100.

The CRC is included in the footer part of the notification packet 1300. The CRC is a code used for error detection of the notification packet 1300. The counter value is included in the body part of the notification packet 1300. The counter value is set for the identification information of each information processing apparatus 100. The counter value is set, for example, for each coordinate of an information processing apparatus 100. The counter value for each information processing apparatus 100 is a measurement time period measured for each information processing apparatus 100. The ID is included in the header part of the notification packet 1300. The ID is identification information of the notification packet 1300.

The transmission source coordinate is included in the header part of the notification packet 1300. The transmission source coordinate is a coordinate on the computer system 500 at which the transmission source of the notification packet 1300 exists. The transmission source coordinate is, for example, identification information of the own apparatus that becomes a transmission source. The destination coordinate is included in the header part of the notification packet 1300. The destination coordinate is a coordinate on the computer system 500 at which the destination of the notification packet 1300 exists. The destination coordinate is, for example, identification information of the information processing apparatus 100 of the destination and is identification information of the information processing apparatus 100 that is the transmission source of the packet 800 whose counter value is determined to be equal to or higher than the threshold value.

The notification packet 1300 may include a flag V associated with the counter value. The flag V is information indicative of whether or not a counter value is set already in the notification packet 1300. Further, the notification packet 1300 may include a flag J associated with the destination coordinate. The flag J is information indicating that the packet is the notification packet 1300.

The different calculation system can be configured such that the information processing apparatus 100 that transfers the notification packet 1300 transfers the notification packet 1300 depicted in FIG. 16 after the information processing apparatus 100 sets a stay time period in the own apparatus to the notification packet 1300. Consequently, the user of the different example of the computer system 500 can recognize the stay time period of the packet 800 on an information processing apparatus 100 on a transfer path of the notification packet 1300.

At this time, the information processing apparatus 100 can refer to the V flag to prevent the set stay time period from being used for overwriting. Further, when setting a stay time period, the information processing apparatus 100 re-calculates a CRC to overwrite the CRC.

(Notification Processing Procedure)

An example of a notification processing procedure is described with reference to FIG. 17. An information processing apparatus 100 may implement such a notification process as illustrated in FIG. 17 by software using the CPU 201 and the memory 202.

Figure 17:
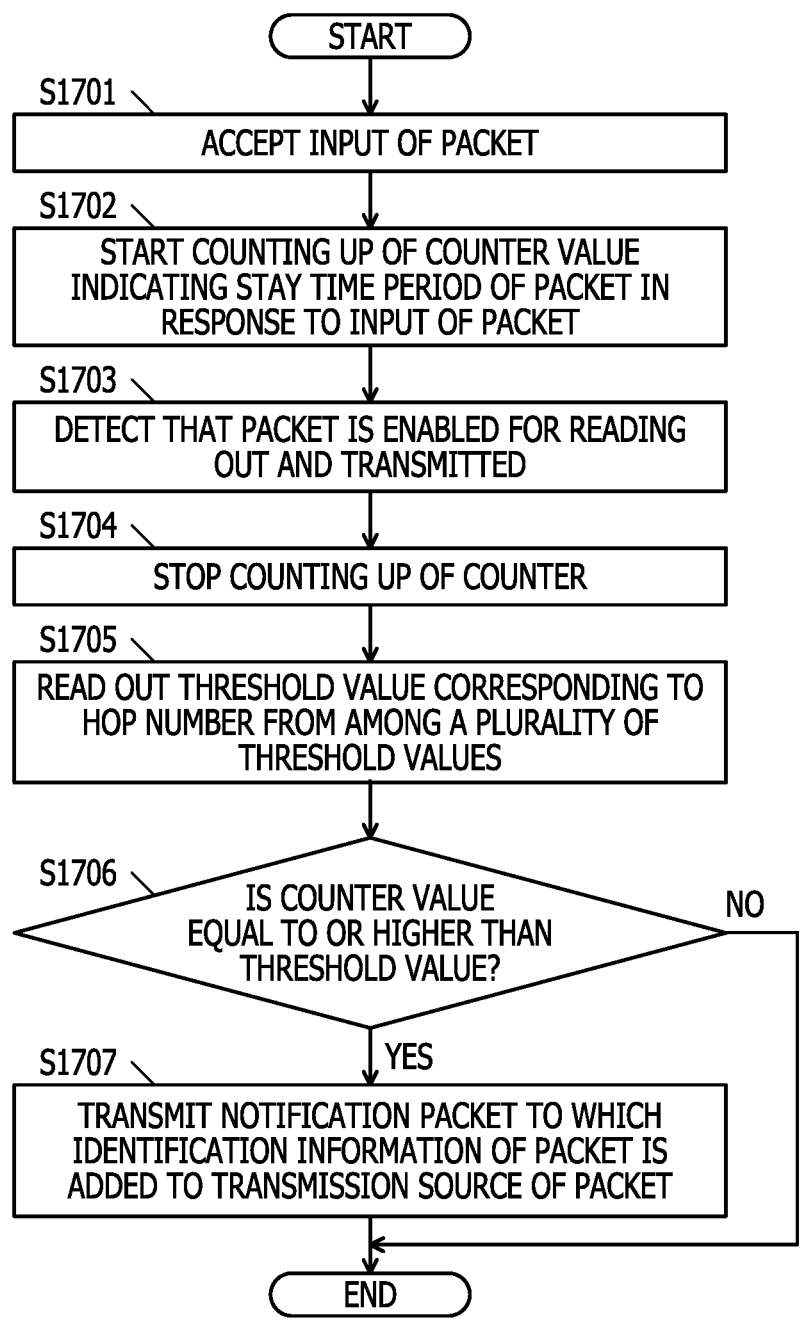
FIG. 17 is a flow chart illustrating an example of a notification processing procedure.

FIG. 17 is a flow chart illustrating an example of the notification processing procedure. Referring to FIG. 17, the information processing apparatus 100 accepts an input of a packet 800 to the transmission buffer 340 or the reception buffer 310 (S1701).

Then, the information processing apparatus 100 starts counting up of the counter value indicative of the stay time period of the packet 800 in response to the input of the packet 800 to the transmission buffer 340 or the reception buffer 310 (S1702). Then, the information processing apparatus 100 arbitrates packets 800 retained in the transmission buffer 340 and the reception buffer 310 to detect that a packet 800 is enabled for reading out and transmitted (S1703).

Then, the information processing apparatus 100 stops the counting up of the counter (S1704). Then, the information processing apparatus 100 compares the coordinate of the own apparatus and the transmission source coordinate with each other to calculate the hop number of the read out packet 800 and reads out a threshold value corresponding to the hop number from among the plurality of threshold values (S1705).

Then, the information processing apparatus 100 decides whether or not the counter value is equal to or higher than the threshold value (S1706). Here, if the counter value is lower than the threshold value (S1706: No), then the information processing apparatus 100 ends the notification process.

On the other hand, if the counter value is equal to or higher than the threshold value (S1706: Yes), then the information processing apparatus 100 transmits a notification packet 1300 for the notification of occurrence of a problem on a communication path with the read out identification information of the packet 800 added thereto to the transmission source of the packet 800 (S1707). Then, the information processing apparatus 100 ends the notification process. Consequently, the information processing apparatus 100 can transmit information capable of identifying the packet 800, which has the possibility that the stay time period may have been increased by congestion of the own apparatus, to the transmission source of the packet 800.

As described above, with the information processing apparatus 100, a stay time period of a certain transmission-waiting packet 800 whose transmission source is a second apparatus in the storage unit 602 can be measured. Further, with the information processing apparatus 100, it can be specified whether or not the measured stay time period is equal to or longer than a threshold value corresponding to a hop number from the second apparatus to the own apparatus, and when it is determined that the stay time period is equal to or longer than the threshold value, information capable of identifying the packet 800 can be outputted.

Consequently, the information processing apparatus 100 can suppress such an erroneous decision that, although the stay time period increases due to an increase of the hop number, there is the possibility that a packet 800 may have resided in the own apparatus. On the other hand, even if a plurality of packets 800 indicate a stay time period longer than the predetermined value, the information processing apparatus 100 can discriminate a packet 800 that has the possibility that the packet 800 may have resided in the own apparatus and a packet 800 that has predetermined rise to increase of the stay time period by increase of the hop number from each other. Further, the information processing apparatus 100 can output information capable of identifying the packet 800 that has the possibility that the packet 800 may have resided in the own apparatus.

Further, with the information processing apparatus 100, when it is determined that the stay time period is equal to or longer than the threshold value, information capable of identifying the certain packet 800 can be transmitted to at least one of the transmission source and the destination of the certain packet 800. Consequently, the information processing apparatus 100 can notify a user of the computer system 500 that there is the possibility that a packet 800 may have resided in the own apparatus.

Further, with the information processing apparatus 100, when it is determined that the stay time period is equal to or longer than the threshold value, information capable of identifying a certain packet 800 can be transmitted to the transmission source in response to a request from the transmission source of the certain packet 800. Consequently, since the information processing apparatus 100 does not have to perform a transmission process every time it is determined that the stay time period is equal to or longer than the threshold value, increase of the communication amount in the computer system 500 can be suppressed.

Further, with the information processing apparatus 100, as the correspondence information 103, information representative of a corresponding relationship among a hop number, a ratio at which a transmission-waiting packet 800 whose transmission source is the first apparatus or the second apparatus is transmitted and a threshold value for the stay time period can be used. Further, with the information processing apparatus 100, it is possible to refer to the correspondence information 103 to decide whether or not the measured stay time period is equal to or longer than a threshold value corresponding to the combination of the calculated hop number and the predetermined ratio. Consequently, the information processing apparatus 100 can decide whether the stay time period of the packet 800 is the stay time period when the stay time period of the packet 800 indicates a throughput in accordance with the hop number of the packet 800 or the stay time period when the packet 800 resides in the own apparatus.

Further, with the information processing apparatus 100, the stay time period in the storage unit 602 can be measured with regard to a certain one of a series of packets 800 generated by a same job from within a packet 800 group whose transmission source is the second apparatus. Further, with the information processing apparatus 100, when it is determined that the measured stay time period is equal to or longer than the threshold value, information capable of identifying the certain packet 800 is outputted after the series of packets 800 is transmitted. Consequently, since the information processing apparatus 100 transmits, collectively for each job, information indicating whether or not there is the possibility that a series of packets 800 generated by the job may have resided, increase of the communication amount in the computer system 500 can be suppressed.

Further, with the information processing apparatus 100, when it is determined that the measured stay time period is equal to or longer than the threshold value, information capable of identifying a certain packet 800 and the measured stay time period can be outputted in an associated relationship with each other. Consequently, the measurement unit 604 can acquire a parameter to be referred to by a user of the computer system 500 when a cause of residence of a packet 800 or the like is to be analyzed.

Further, with the information processing apparatus 100, information that associates a range of the hop number and a threshold value for the stay time period can be used as the correspondence information 103. Further, with the information processing apparatus 100, by referring to the correspondence information 103, it can be determined whether or not the measured stay time period is equal to or longer than a threshold value corresponding to the range including the hop number from the second apparatus to the own apparatus. Consequently, since the information processing apparatus 100 need not store the threshold value for each of hop numbers, the memory size of the correspondence information table 900 can be reduced.

Further, with the information processing apparatus 100, at least one of a minimum value, a maximum value and an average value of the stay time period is calculated, and a result of the calculation can be outputted. Consequently, the measurement unit 604 can acquire a parameter that is referred to by a user of the computer system 500 when a cause of residence of a packet 800 or the like is to be analyzed.

Further, with the information processing apparatus 100, an own apparatus can be adopted as a first apparatus, and as a second apparatus, each of one or more apparatuses different from the information processing apparatus 100 can be adopted. Consequently, the information processing apparatus 100 can be adapted to a case in which a transmission-waiting packet 800 whose transmission source is the own apparatus and a transmission-waiting packet 800 whose transmission source is a different information processing apparatus 100 are transmitted at a predetermined ratio.

Further, with the information processing apparatus 100, a first buffer that retains a transmission-waiting packet 800 whose transmission source is the first apparatus and a second buffer that retains a transmission-waiting packet 800 whose transmission source is the second apparatus can be used.

Consequently, the information processing apparatus 100 can classify and process, by hardware, the transmission-waiting packet 800 whose transmission source is the first apparatus and the transmission-waiting packet 800 whose transmission source is the second apparatus.

It is to be noted that the communication packet residence notification method described in the description of the present embodiment can be implemented by executing a program prepared in advance on a computer such as a personal computer or a work station. The communication packet residence notification program is recorded on a computer-readable recording medium such as a hard disk, a flexible disk, a compact disc (CD)-ROM, a magneto-optical (MO) disk or a digital versatile disc (DVD) and is executed by being read out from the recording medium by a computer. Further, the communication packet residence notification program may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory configured to store first transmission-waiting packets whose transmission source is a first apparatus and second transmission-waiting packets whose transmission source is a second apparatus different from the first apparatus;
   a communication circuit configured to transmit the first transmission-waiting packets and the second transmission-waiting packets in accordance with a predetermined ratio; and
   a processor configured to
      measure a stay time period, in the memory, of a certain packet among the second transmission-waiting packets,
      determine, by referring to correspondence information, whether the measured stay time period is equal to or longer than a threshold value corresponding to a hop number of the certain packet indicating a number of hops from the second apparatus to the information processing apparatus,
         the correspondence information including a plurality of hop numbers in association with a plurality of threshold values respectively, the plurality of threshold values increasing as the plurality of hop numbers increases,
         the hop number of the certain packet being incremented when the certain packet passes any one information processing apparatus in a path from the second apparatus to the information processing apparatus, and
      output, when the stay time period is determined to be equal to or longer than the threshold value, identification information capable of identifying the certain packet.

2. The information processing apparatus according to claim 1, wherein
   when the processor determines that the stay time period is equal to or longer than the threshold value, the processor is configured to transmit the identification information to at least one of the transmission sources and a destination of the certain packet.

3. The information processing apparatus according to claim 1, wherein
   when the processor determines that the stay time period is equal to or longer than the threshold value, the processor is configured to transmit, in response to a request from the transmission source of the certain packet, the identification information to the transmission source.

4. The information processing apparatus according to claim 1, wherein the correspondence information further includes information indicating correspondences among a hop number, a ratio of transmitting the first transmission-waiting packets and the second transmission-waiting packets, and a threshold value for the stay time period, and the processor is configured to determine, by referring the correspondence information, whether the measured stay time period is equal to or longer than the threshold value corresponding to a combination of a calculated hop number and the predetermined ratio.

5. The information processing apparatus according to claim 1, wherein
   the processor is configured to measure a stay time period, in the memory, of a certain packet from within a series of packets generated by the same job from among the second transmission-waiting packets.

6. The information processing apparatus according to claim 1, wherein,
   when the processor determines that the stay time period is equal to or longer than the threshold value, the processor is configured to output the identification information in association with the measured stay time period.

7. The information processing apparatus according to claim 1, wherein the correspondence information further includes information that associates a range of a hop number and a threshold value for a stay time period with each other, and the processor is configured to determine, by referring to the correspondence information, whether the measured stay time period is equal to or longer than a threshold value corresponding to a range that includes the hop number from the second apparatus to the information processing apparatus.

8. The information processing apparatus according to claim 1, wherein
   the processor is configured to
   calculate one of a minimum value, a maximum value, and an average value of stay time periods measured individually regarding more than one packet within the second transmission-waiting packets stored in the memory, and
   output a calculated result.

9. The information processing apparatus according to claim 1, wherein
   the first apparatus is the information processing apparatus, and the second apparatus is each of more than one apparatus different from the information processing apparatus.

10. The information processing apparatus according to claim 1, wherein
the memory includes a first buffer configured to store the first transmission-waiting packets and a second buffer configured to store the second transmission-waiting packets.

11. A method comprising:
storing, by a processor of an information processing apparatus, in a memory of the information processing apparatus, first transmission-waiting packets whose transmission source is a first apparatus and second transmission-waiting packets whose transmission source is a second apparatus different from the first apparatus;
transmitting the first transmission-waiting packets and the second transmission-waiting packets in accordance with a predetermined ratio;
measuring, by the processor, a stay time period, in the memory, of a certain packet among the second transmission-waiting packets;
determining, by the processor, by referring to correspondence information, whether the measured stay time period is equal to or longer than a threshold value corresponding to a hop number of the certain packet indicating a number of hops from the second apparatus to the information processing apparatus,
the correspondence information including a plurality of hop numbers in association with a plurality of threshold values respectively, the plurality of threshold values increasing as the plurality of hop numbers increases,
the hop number of the certain packet being incremented when the certain packet passes any one information processing apparatus in a path from the second apparatus to the information processing apparatus; and
outputting, by the processor, when the stay time period is determined to be equal to or longer than the threshold value, identification information capable of identifying the certain packet.

12. The method according to claim 11, further comprising:
transmitting, by the processor, the identification information to at least one of the transmission sources and a destination of the certain packet, when the stay time period is determined to be equal to or longer than the threshold value.

13. The method according to claim 11, further comprising:
transmitting, by the processor, in response to a request from the transmission source of the certain packet, the identification information to the transmission source, when the stay time period is determined to be equal to or longer than the threshold value.

14. The method according to claim 11, wherein the correspondence information further includes information indicating correspondence among a hop number, a ratio of transmitting the first transmission-waiting packets and the second transmission-waiting packets, and a threshold value for the stay time period, and the method further comprising determining, by the processor, by referring the correspondence information, whether the measured stay time period is equal to or longer than the threshold value corresponding to a combination of a calculated hop number and the predetermined ratio.

15. The method according to claim 11, further comprising:
measuring, by the processor, a stay time period, in the memory, of a certain packet from within a series of packets generated by the same job from among the second transmission-waiting packets.

16. The method according to claim 11, further comprising:
outputting, by the processor, the identification information in association with the measured stay time period, when the stay time period is determined to be equal to or longer than the threshold value.

17. The method according to claim 11, wherein the correspondence information further includes information that associates a range of the hop number and a threshold value for a stay time period with each other, and the method further comprising determining, by the processor, by referring to the correspondence information, whether the measured stay time period is equal to or longer than a threshold value corresponding to a range that includes the hop number from the second apparatus to the information processing apparatus including the processor.

18. The method according to claim 11, further comprising:
calculating, by the processor, one of a minimum value, a maximum value, and an average value of stay time periods measured individually regarding more than one packet within the second transmission-waiting packets stored in the memory; and
outputting, by the processor, a calculated result.

19. A non-transitory computer readable medium having stored therein a program that causes an information processing apparatus to execute a process, the process comprising:
storing, in a memory of the information processing apparatus, first transmission-waiting packets whose transmission source is a first apparatus and second transmission-waiting packets whose transmission source is a second apparatus different from the first apparatus;
transmitting the first transmission-waiting packets and the second transmission-waiting packets in accordance with a predetermined ratio;
measuring a stay time period, in the memory, of a certain packet among the second transmission-waiting packets;
determining, by referring to correspondence information measured stay time period is equal to or longer than a threshold value corresponding to a hop number of the certain packet indicating a number of hops from the second apparatus to the information processing apparatus,
the correspondence information including a plurality of hop numbers in association with a plurality of threshold values respectively, the plurality of threshold values increasing as the plurality of hop numbers increases,
the hop number of the certain packet being incremented when the certain packet passes any one information processing apparatus in a path from the second apparatus to the information processing apparatus; and
outputting, when the stay time period is determined to be equal to or longer than the threshold value, identification information capable of identifying the certain packet.

20. The non-transitory computer readable medium according to claim 19, wherein the process further comprising:

transmitting the identification information to at least one of the transmission sources and a destination of the certain packet, when the stay time period is determined to be equal to or longer than the threshold value.

* * * * *